(12) United States Patent
Kim et al.

(10) Patent No.: US 10,583,819 B2
(45) Date of Patent: Mar. 10, 2020

(54) ELECTRONIC BRAKE SYSTEM

(71) Applicant: MANDO CORPORATION, Gyeonggi-do (KR)

(72) Inventors: Hyunho Kim, Gyeonggi-do (KR); Seong Ho Choi, Gyeonggi-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 49 days.

(21) Appl. No.: 15/987,820

(22) Filed: May 23, 2018

(65) Prior Publication Data

US 2018/0339690 A1  Nov. 29, 2018

(30) Foreign Application Priority Data

May 23, 2017  (KR) .................. 10-2017-0063377
May 23, 2017  (KR) .................. 10-2017-0063383
(Continued)

(51) Int. Cl.
*B60T 13/68* (2006.01)
*B60T 13/74* (2006.01)
(Continued)

(52) U.S. Cl.
CPC .............. *B60T 13/745* (2013.01); *B60T 8/17* (2013.01); *B60T 13/58* (2013.01); *B60T 13/686* (2013.01);
(Continued)

(58) Field of Classification Search
CPC .......... B60T 8/17; B60T 13/58; B60T 13/686; B60T 13/745; B60T 17/22;
(Continued)

(56) References Cited

U.S. PATENT DOCUMENTS 6,604,795 B2 * 8/2003 Isono .................... B60T 8/4081
303/11
6,899,403 B2 * 5/2005 Isono .................... B60T 8/4018
303/11
(Continued)

FOREIGN PATENT DOCUMENTS

CN  101998916  3/2011
CN  102303595  1/2012
(Continued)

OTHER PUBLICATIONS

Office Action dated Aug. 27, 2018 for Korean Patent Application No. 10-2017-0101196 and its English translation by Google Translate.
(Continued)

*Primary Examiner* — Thomas W Irvin
(74) *Attorney, Agent, or Firm* — Ladas & Parry, LLP

(57) ABSTRACT

Disclosed is an electronic brake system. The electronic brake system comprises a hydraulic pressure supply apparatus generating a hydraulic pressure by using a piston operated by an electrical signal outputted corresponding to a displacement of a brake pedal and including a first pressure chamber provided at one side of the piston movably accommodated in a cylinder block to be connected to one or more wheel cylinders and a second pressure chamber provided at the other side of the piston to be connected to one or more wheel cylinders; a first hydraulic passage communicating with the first pressure chamber; a second hydraulic passage branched from the first hydraulic passage; a third hydraulic passage branched from the first hydraulic passage; a fourth hydraulic passage communicating with the second pressure chamber; a fifth hydraulic passage branched from the fourth hydraulic passage to join with the second hydraulic passage; a sixth hydraulic passage branched from the fourth hydraulic passage to join with the third hydraulic passage; a first (Continued)

control valve provided on the second hydraulic passage to control the flow of oil; a second control valve provided on the third hydraulic passage to control the flow of oil; a third control valve provided on the fifth hydraulic passage to control the flow of oil; a fourth control valve provided on the sixth hydraulic passage to control the flow of oil; a first hydraulic circuit branched from the second hydraulic passage or the fifth hydraulic passage to be connected to two wheel cylinders; and a second hydraulic circuit branched from the third hydraulic passage or the sixth hydraulic passage to be connected to two wheel cylinders.

15 Claims, 20 Drawing Sheets

(30) Foreign Application Priority Data

Aug. 9, 2017 (KR) .................. 10-2017-0101196
May 23, 2018 (KR) .................. 10-2018-0058163

(51) Int. Cl.
 *B60T 13/58* (2006.01)
 *B60T 17/22* (2006.01)
 *B60T 8/17* (2006.01)

(52) U.S. Cl.
 CPC ........... *B60T 17/22* (2013.01); *B60T 2270/10* (2013.01); *B60T 2270/404* (2013.01); *B60T 2270/82* (2013.01); *B60T 2270/88* (2013.01)

(58) Field of Classification Search
 CPC ........... B60T 2270/10; B60T 2270/404; B60T 2270/82; B60T 2270/88; B60T 8/4081
 See application file for complete search history.

(56) References Cited

U.S. PATENT DOCUMENTS

| | | | | |
|---|---|---|---|---|
| 6,953,229 B2* | 10/2005 | Isono | ............... | B60T 8/4081 303/113.4 |
| 9,145,119 B2* | 9/2015 | Biller | ............... | B60T 8/4081 |
| 9,205,821 B2* | 12/2015 | Biller | ............... | B60T 8/4081 |
| 9,233,673 B2* | 1/2016 | Ohkubo | ............... | B60T 7/042 |
| 9,308,905 B2* | 4/2016 | Biller | ............... | B60T 8/4081 |
| 9,566,960 B2* | 2/2017 | Feigel | ............... | B60T 8/36 |
| 10,040,438 B2* | 8/2018 | Lim | ............... | B60T 7/042 |
| 10,077,036 B2* | 9/2018 | Kim | ............... | B60T 7/042 |
| 10,137,877 B2* | 11/2018 | Feigel | ............... | B60T 8/4081 |
| 10,144,401 B2* | 12/2018 | Choi | ............... | B60T 13/68 |
| 2017/0129469 A1* | 5/2017 | Besier | ............... | B60T 13/662 |
| 2018/0050670 A1* | 2/2018 | Feigel | ............... | B60T 7/042 |
| 2018/0111593 A1* | 4/2018 | Kim | ............... | B60T 8/4081 |
| 2019/0100179 A1* | 4/2019 | Lee | ............... | B60T 8/4081 |
| 2019/0100180 A1* | 4/2019 | Park | ............... | B60T 8/4081 |
| 2019/0100183 A1* | 4/2019 | Jung | ............... | B60T 13/58 |
| 2019/0100185 A1* | 4/2019 | Jeong | ............... | B60T 8/4081 |
| 2019/0100186 A1* | 4/2019 | Jeong | ............... | B60T 8/4081 |
| 2019/0100187 A1* | 4/2019 | Jeong | ............... | B60T 7/042 |
| 2019/0135256 A1* | 5/2019 | Lee | ............... | B60T 13/686 |

FOREIGN PATENT DOCUMENTS

| | | |
|---|---|---|
| CN | 102365194 | 2/2012 |
| CN | 103241233 | 8/2013 |
| CN | 105026232 | 11/2015 |
| CN | 105691372 | 6/2016 |
| CN | 106585599 | 4/2017 |
| EP | 2 520 473 | 11/2012 |
| JP | 5761373 | 8/2015 |
| KR | 10-2017-0059042 | 5/2017 |
| KR | 10-2017-0076764 | 7/2017 |

OTHER PUBLICATIONS

Office Action dated Oct. 9, 2019 for Chinese Patent Application No. 201810501434.8 and its English machine translation by Google Translate.

* cited by examiner

[Fig. 1]
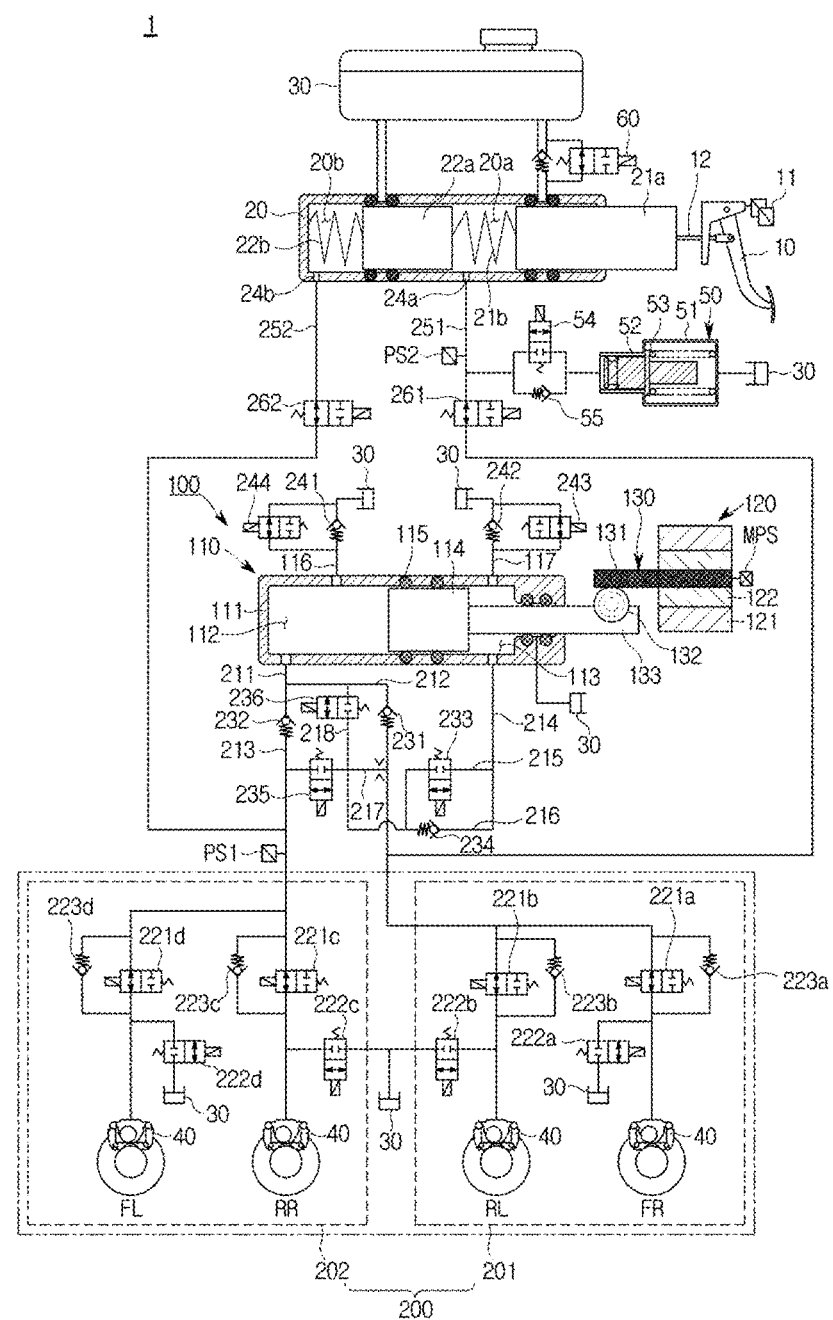

[Fig. 2]
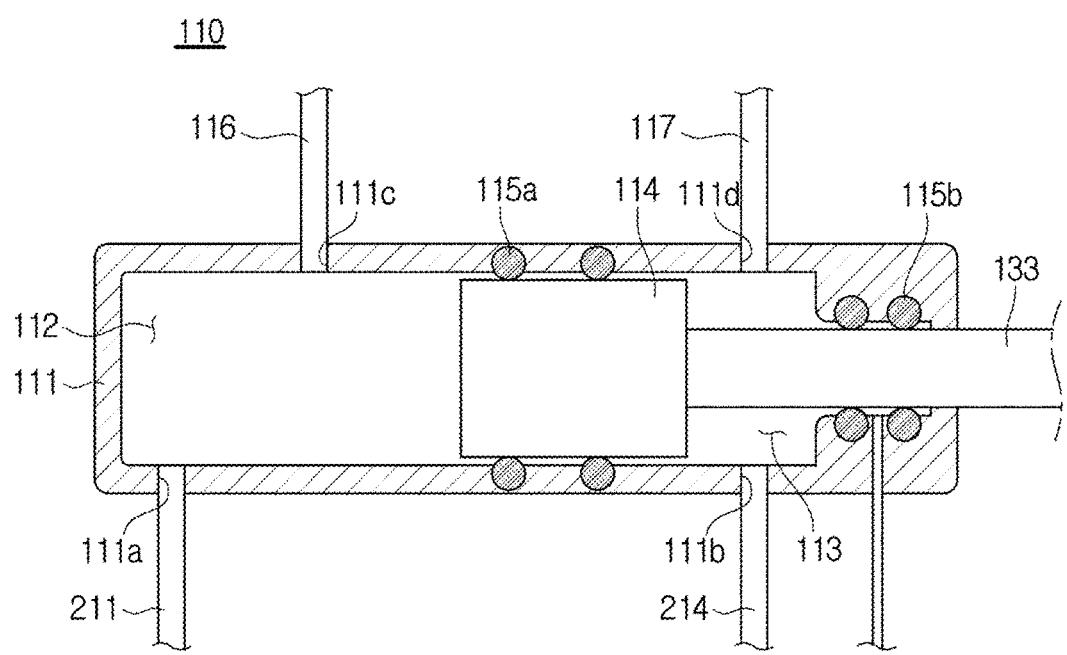

[Fig. 3]
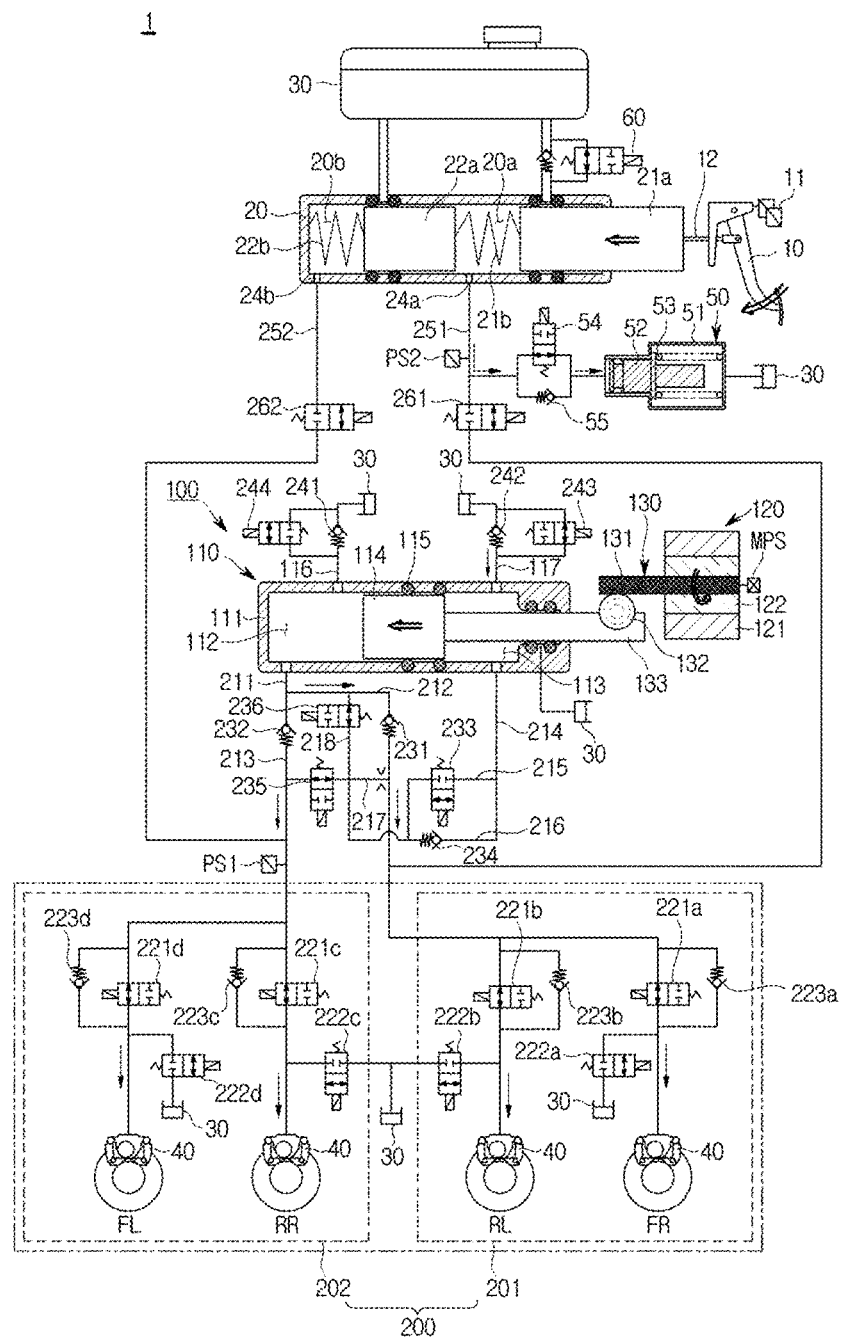

[Fig. 4]
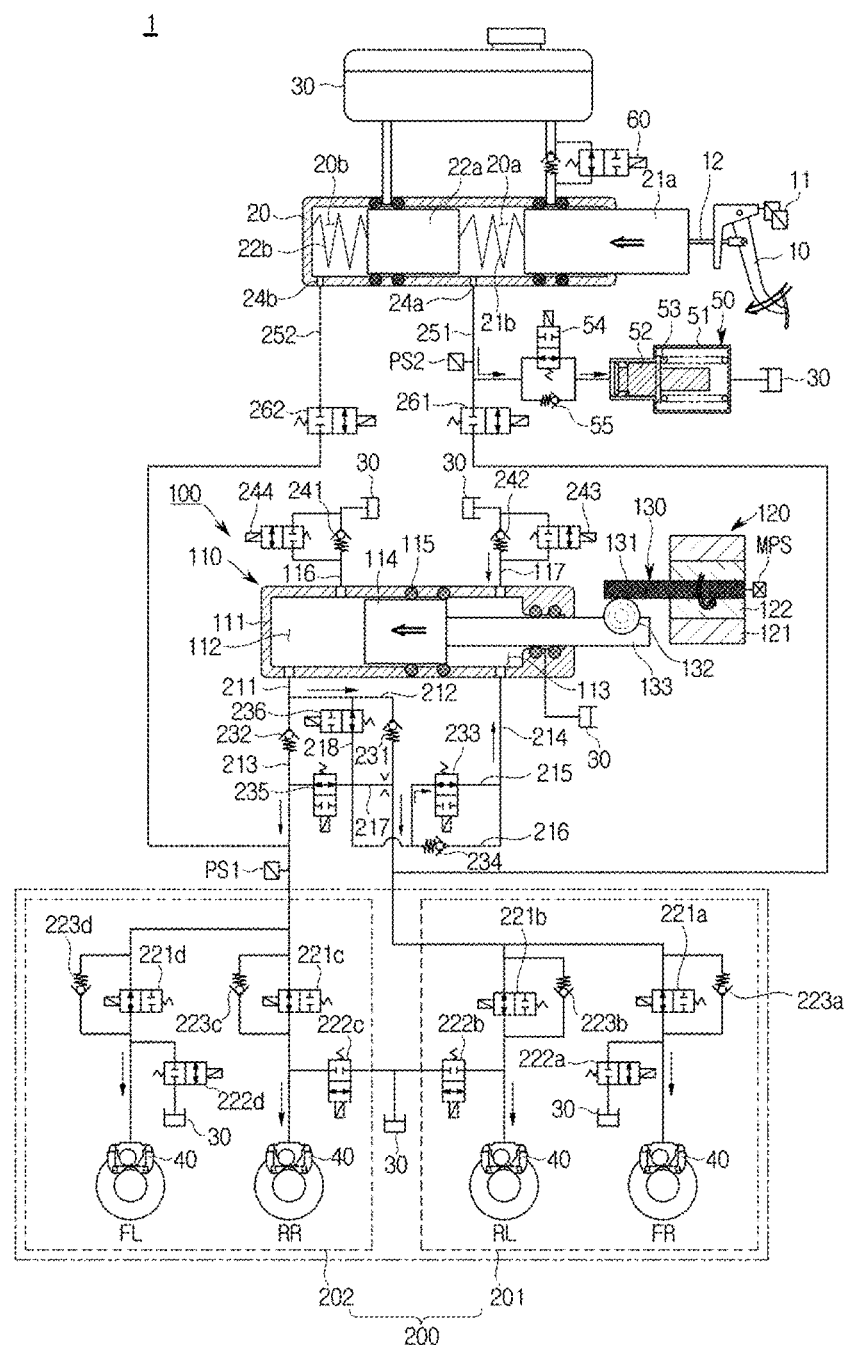

[Fig. 5]
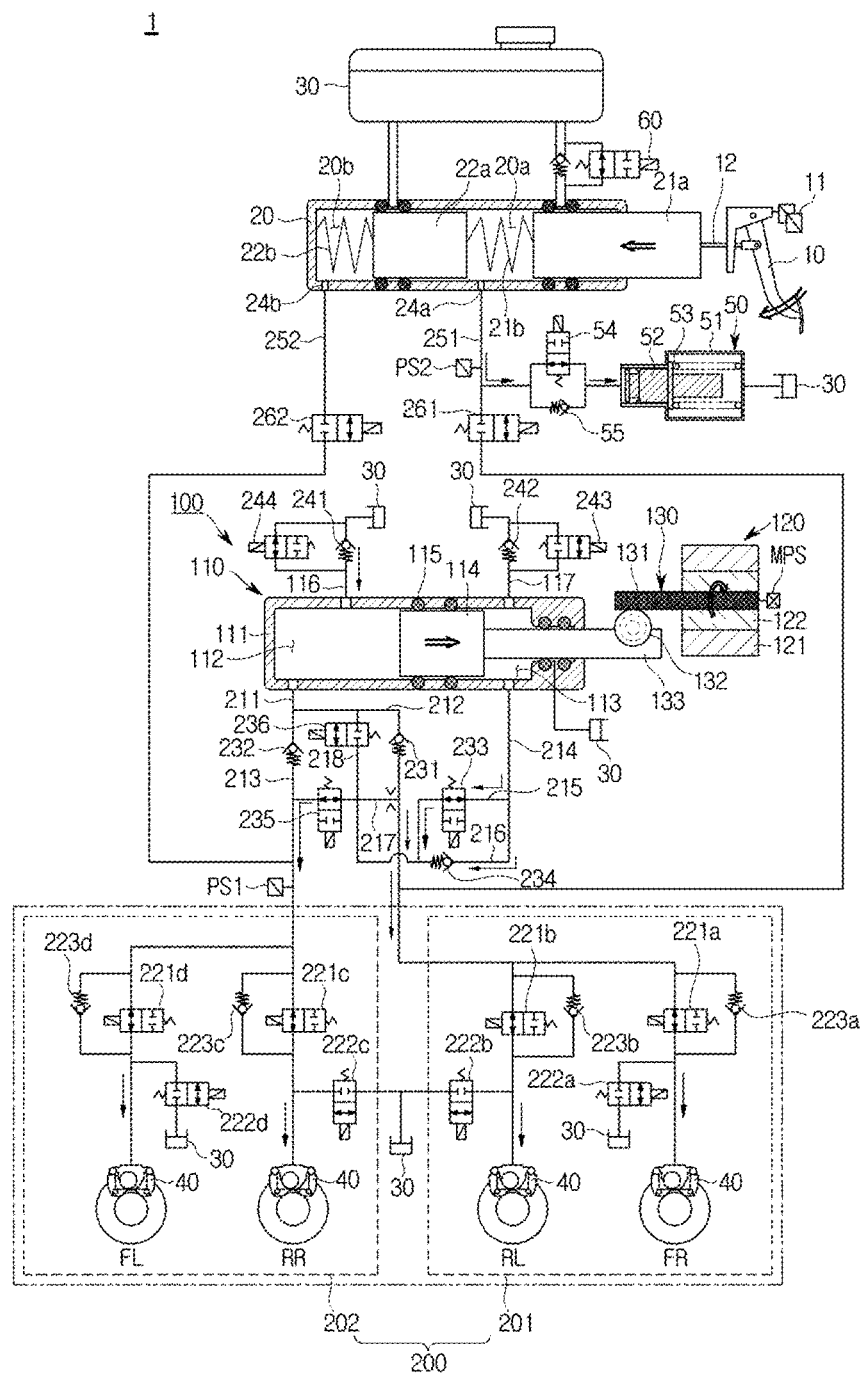

[Fig. 6]
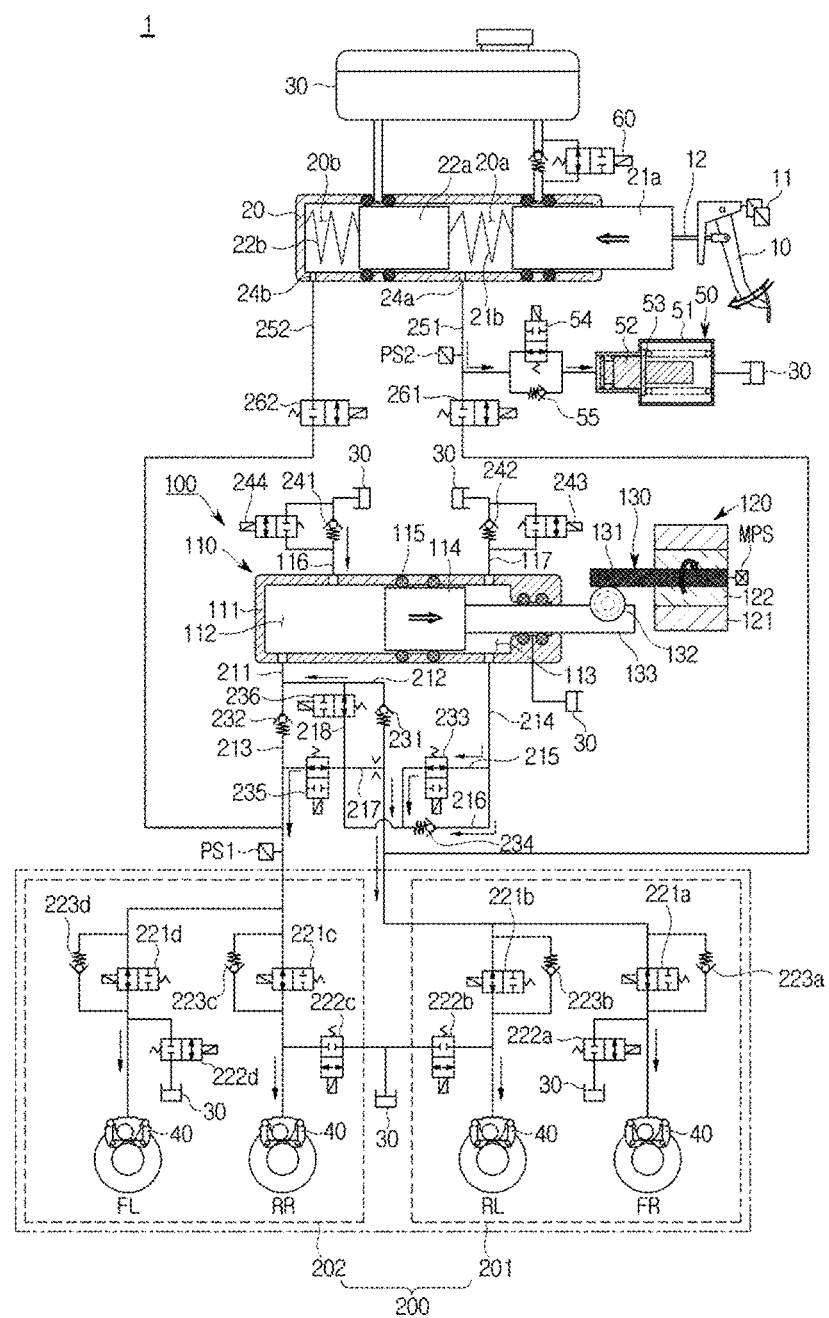

[Fig. 7]
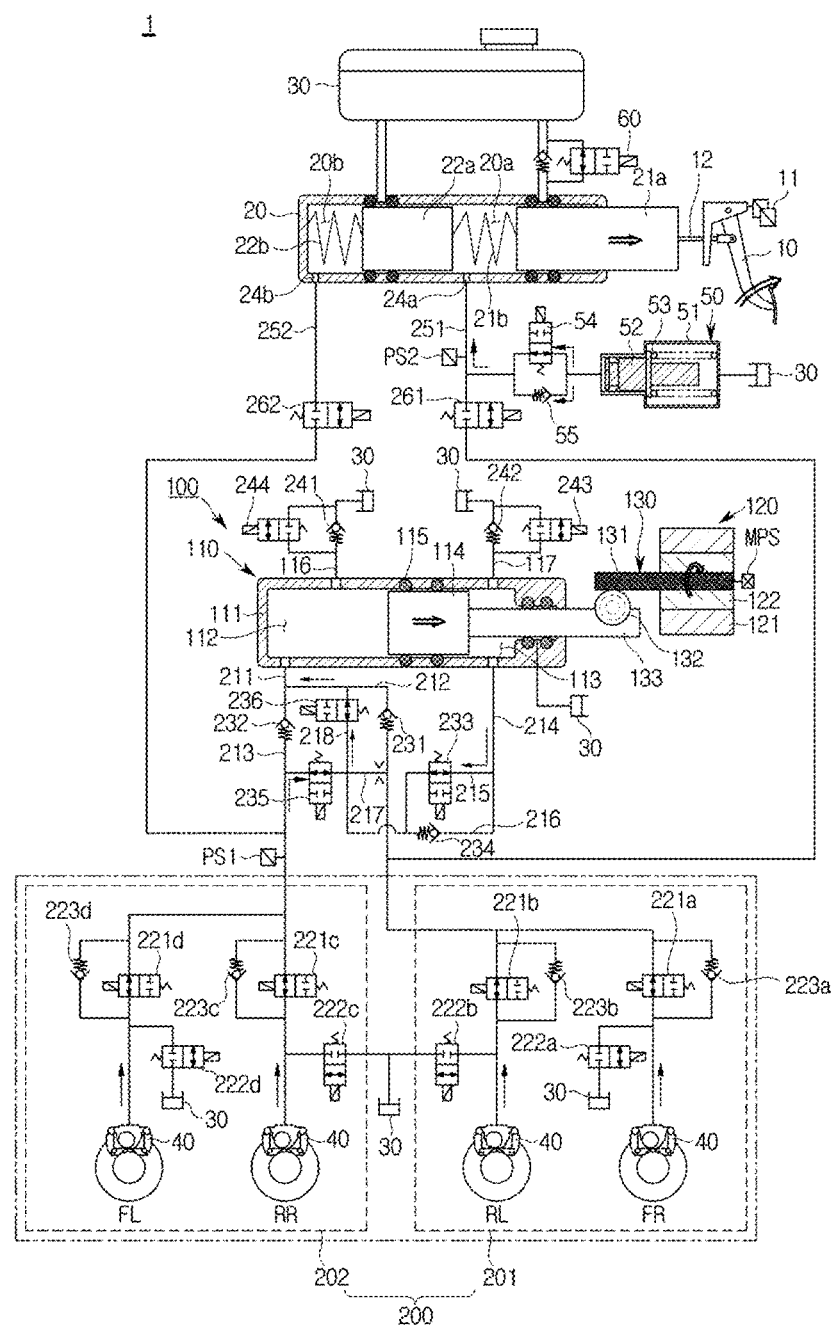

【Fig. 8】
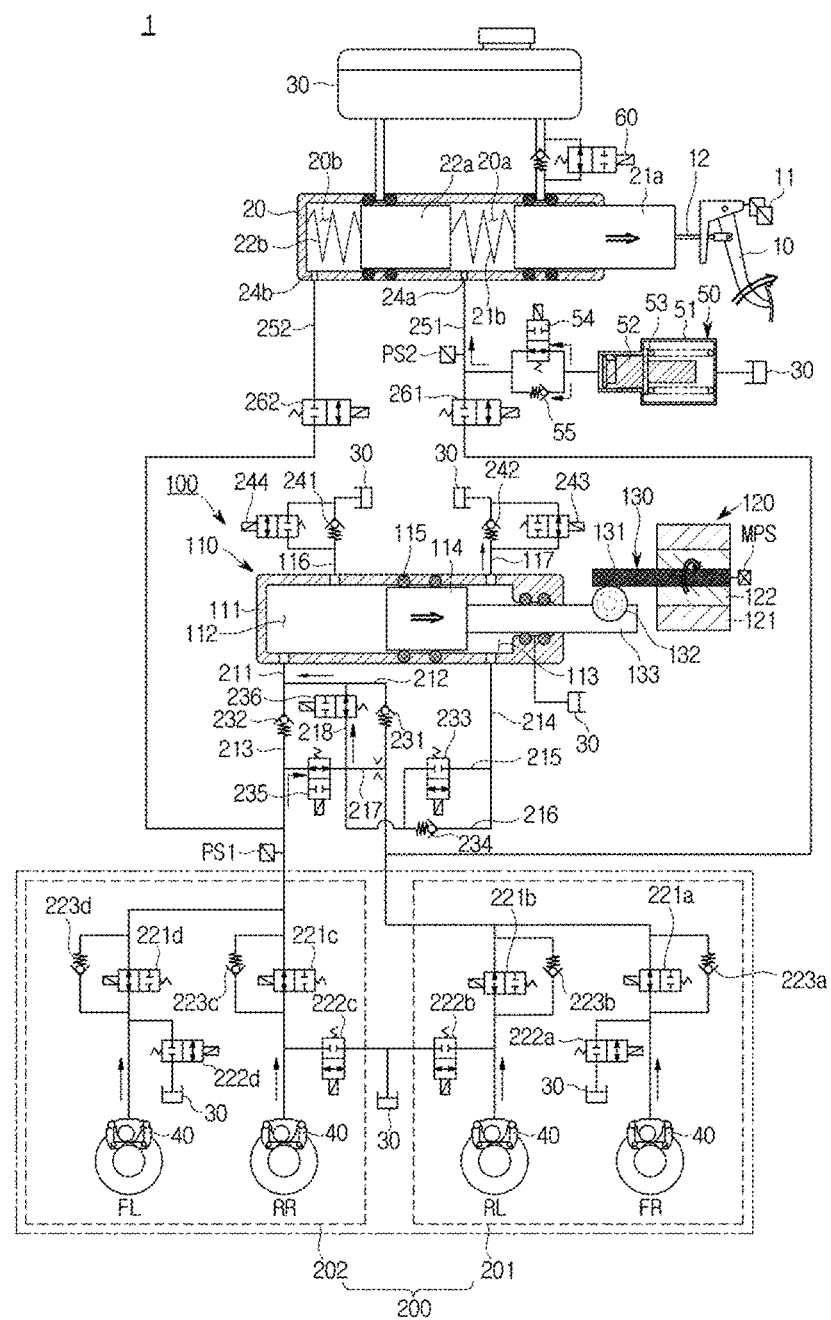

[Fig. 9]
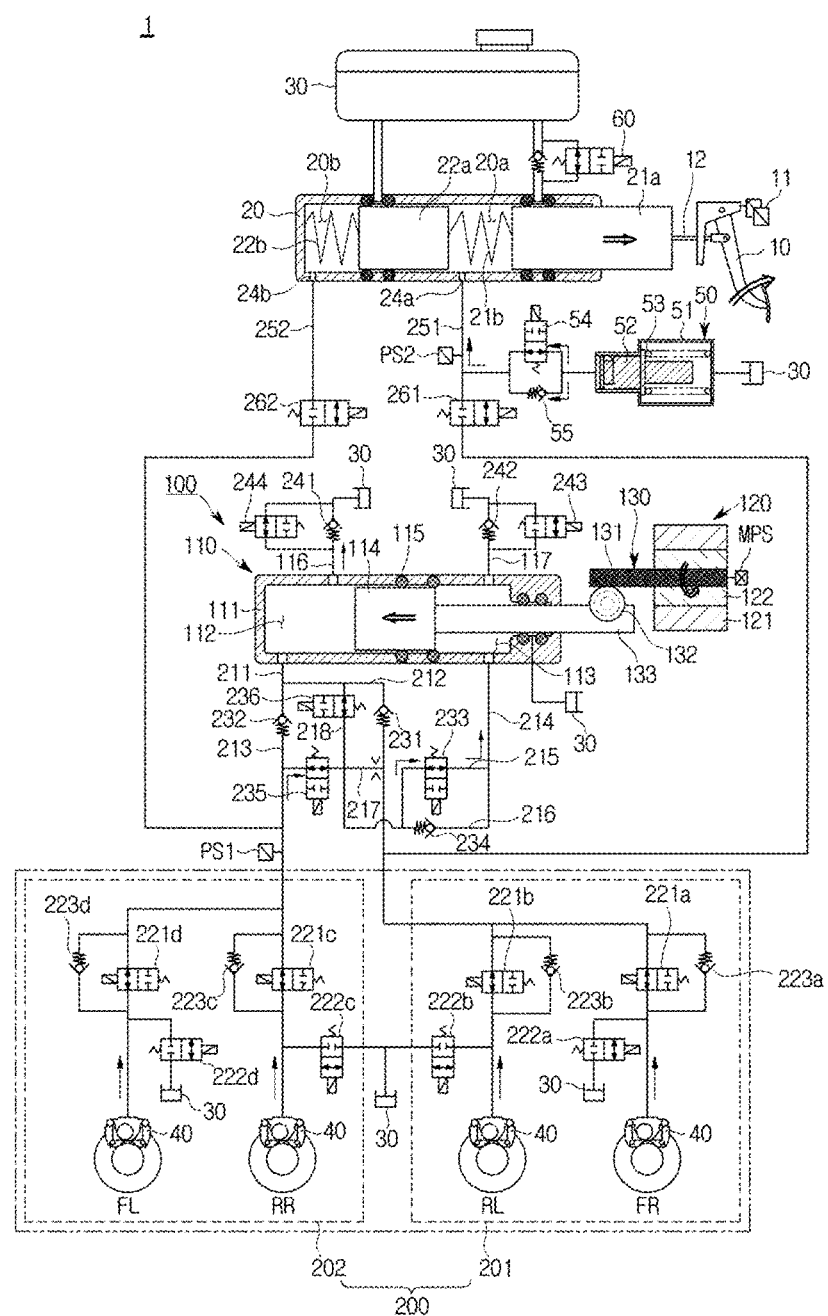

[Fig. 10]
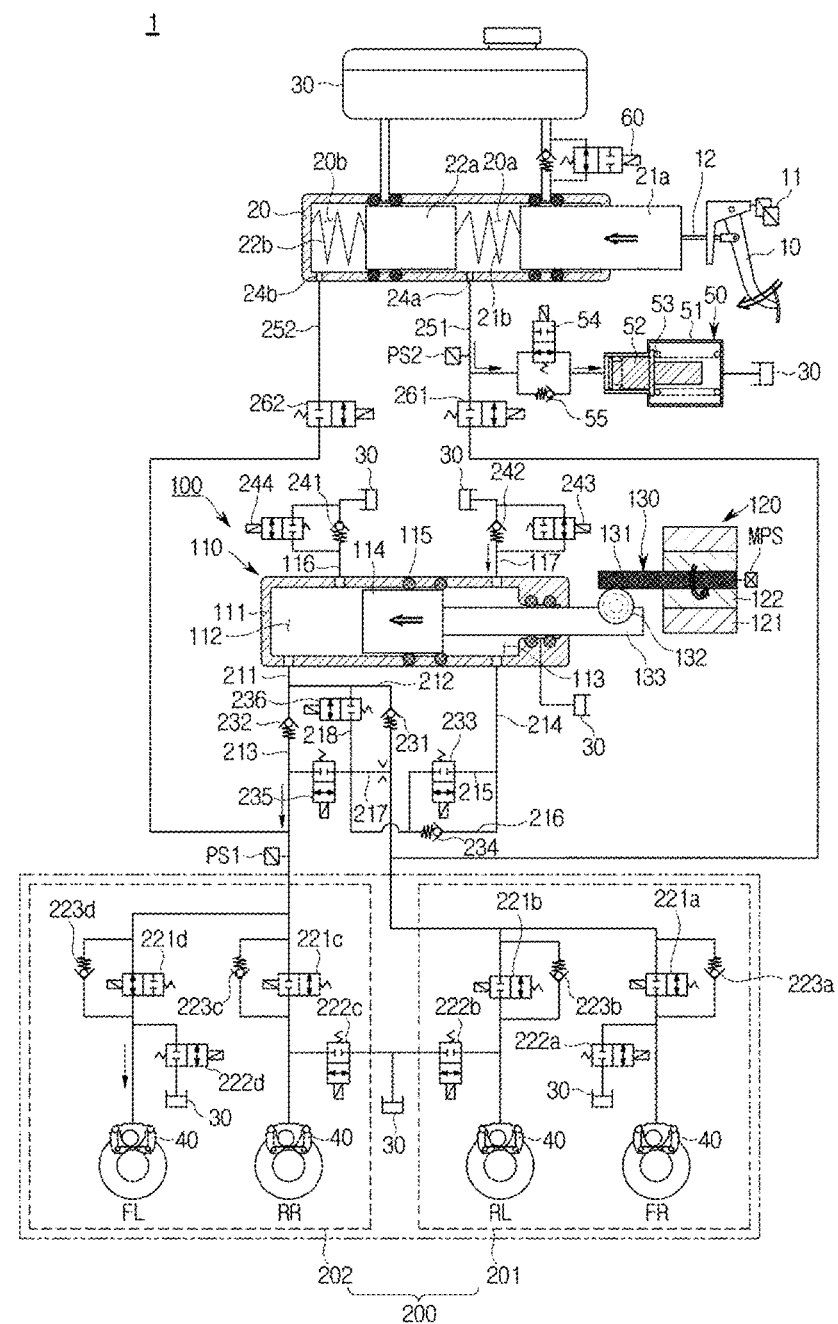

[Fig. 11]
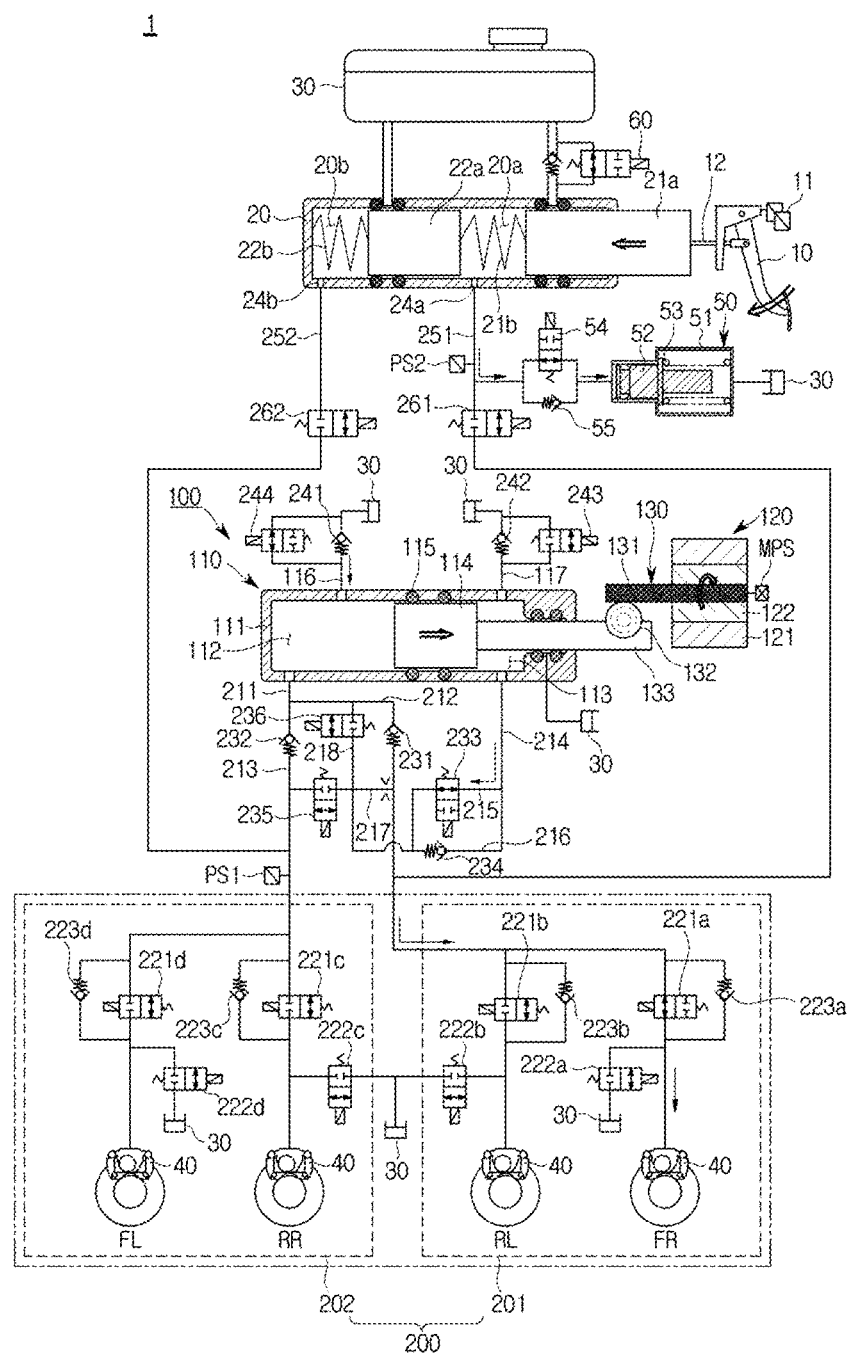

【Fig. 12】
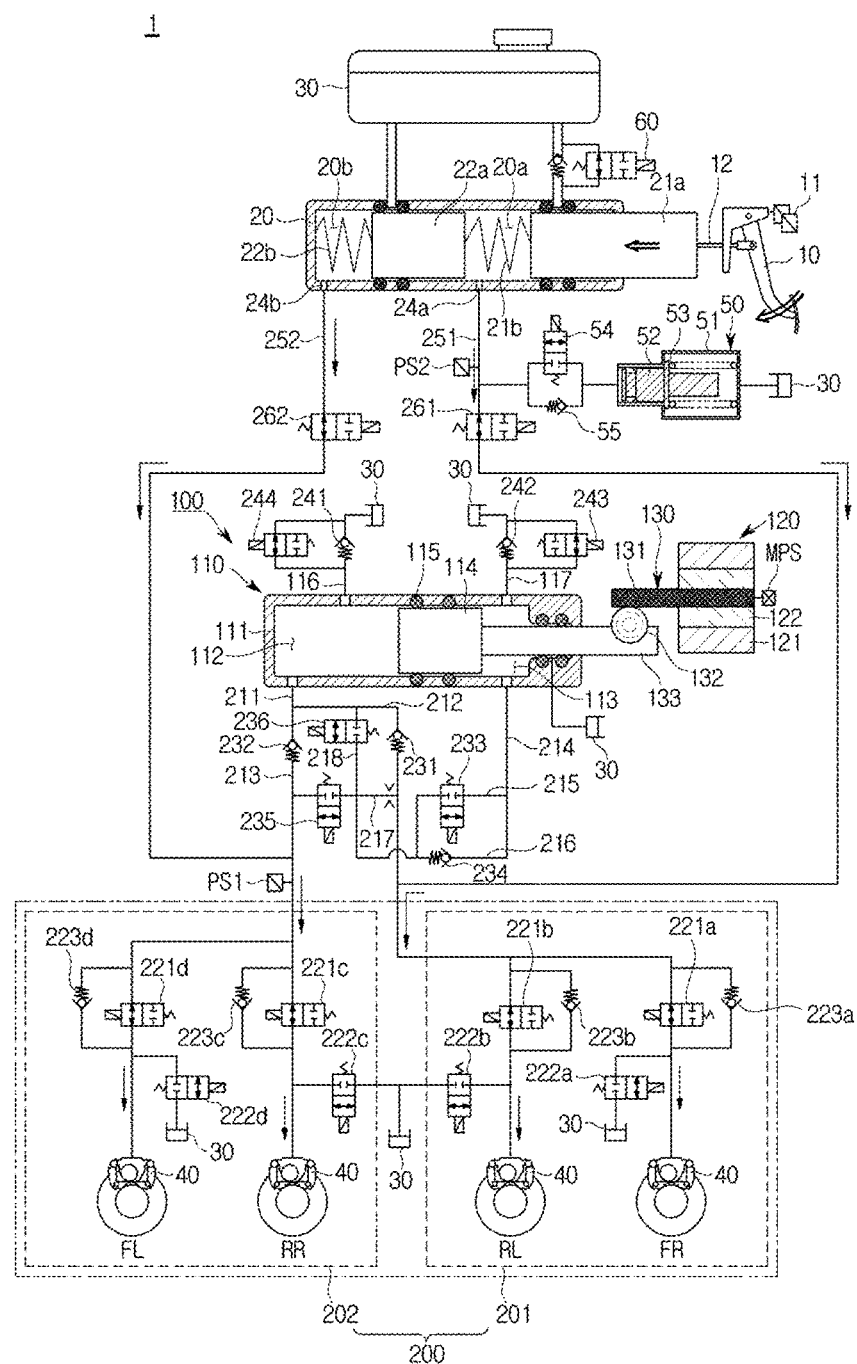

[Fig. 13]
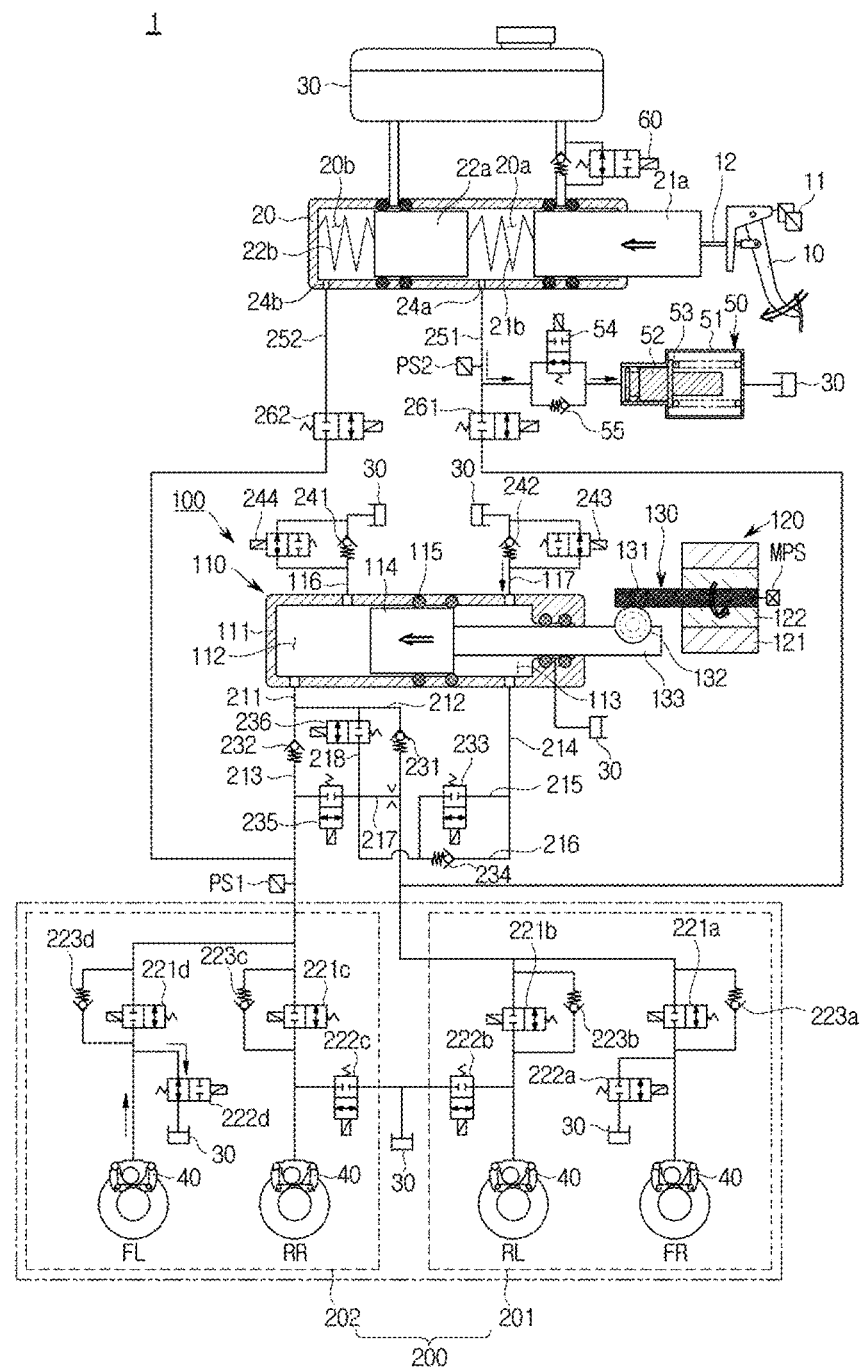

[Fig. 14]
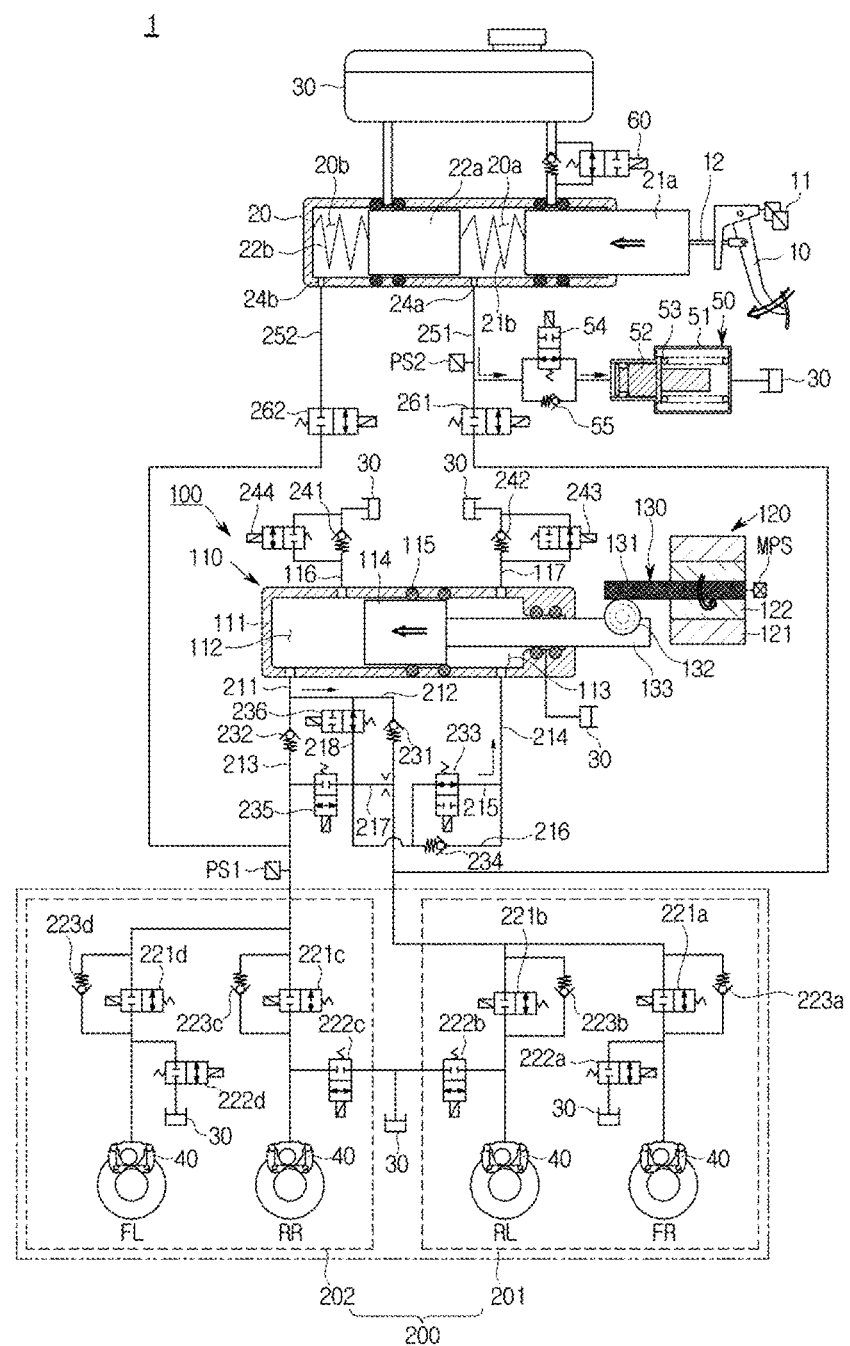

[Fig. 15]
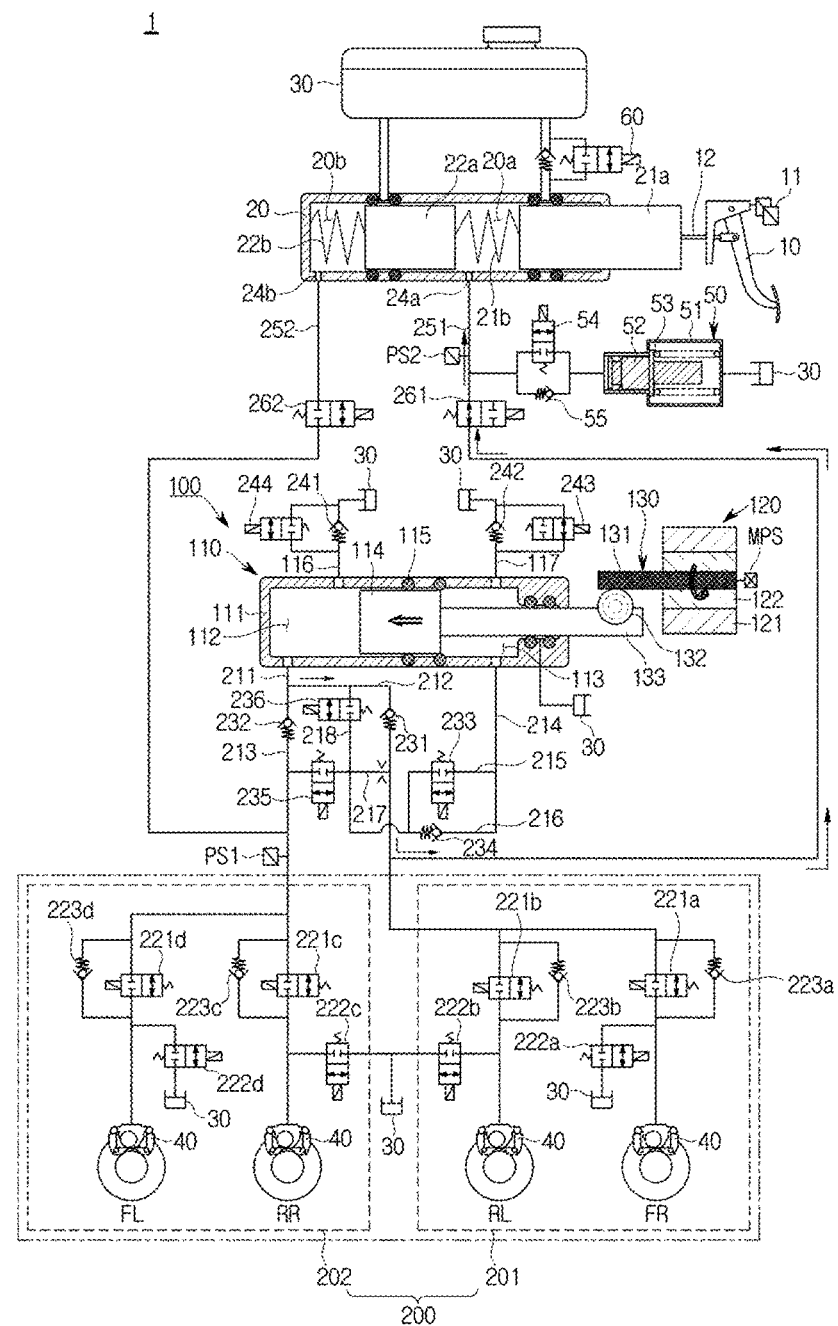

[Fig. 16]
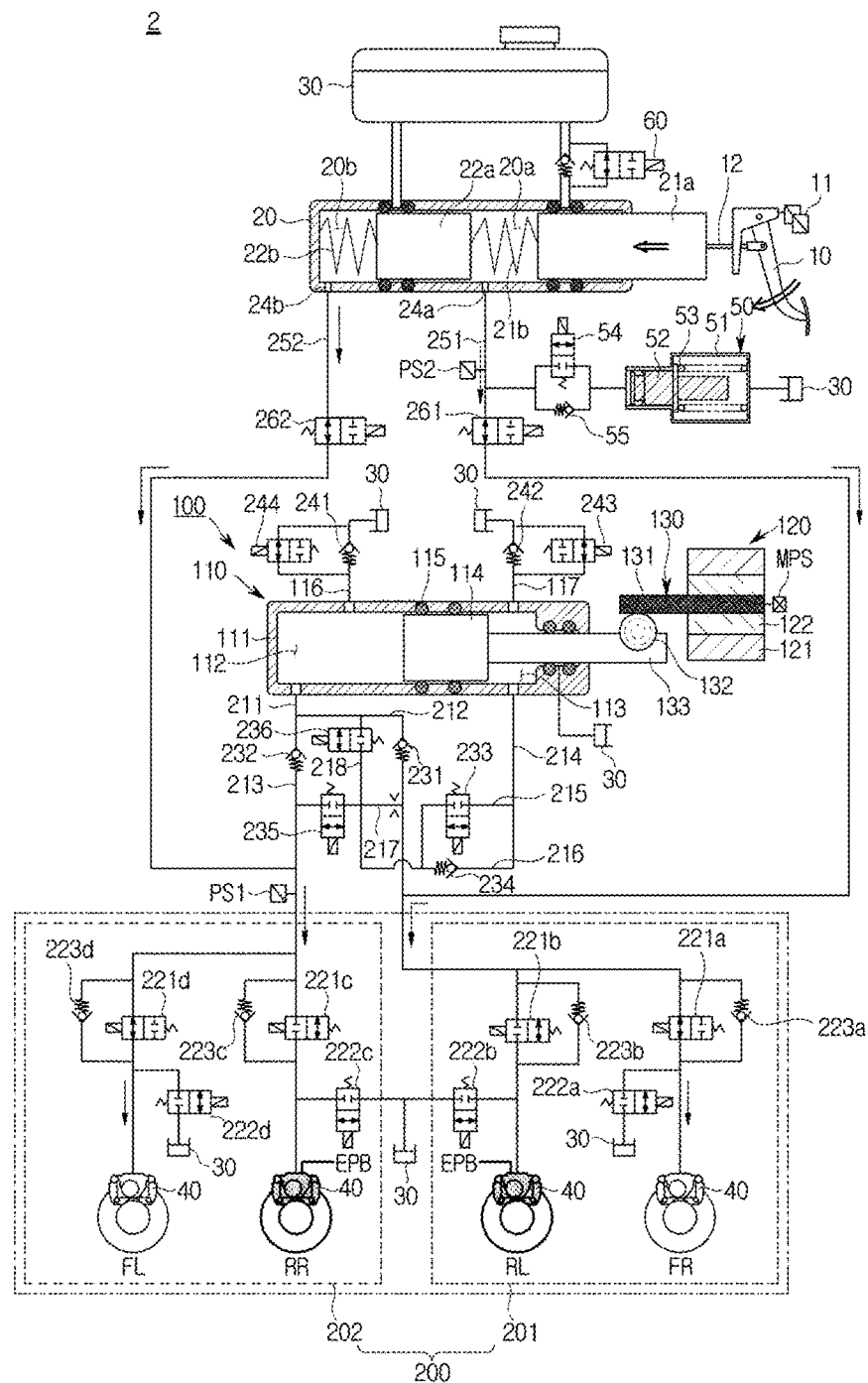

[Fig. 17]
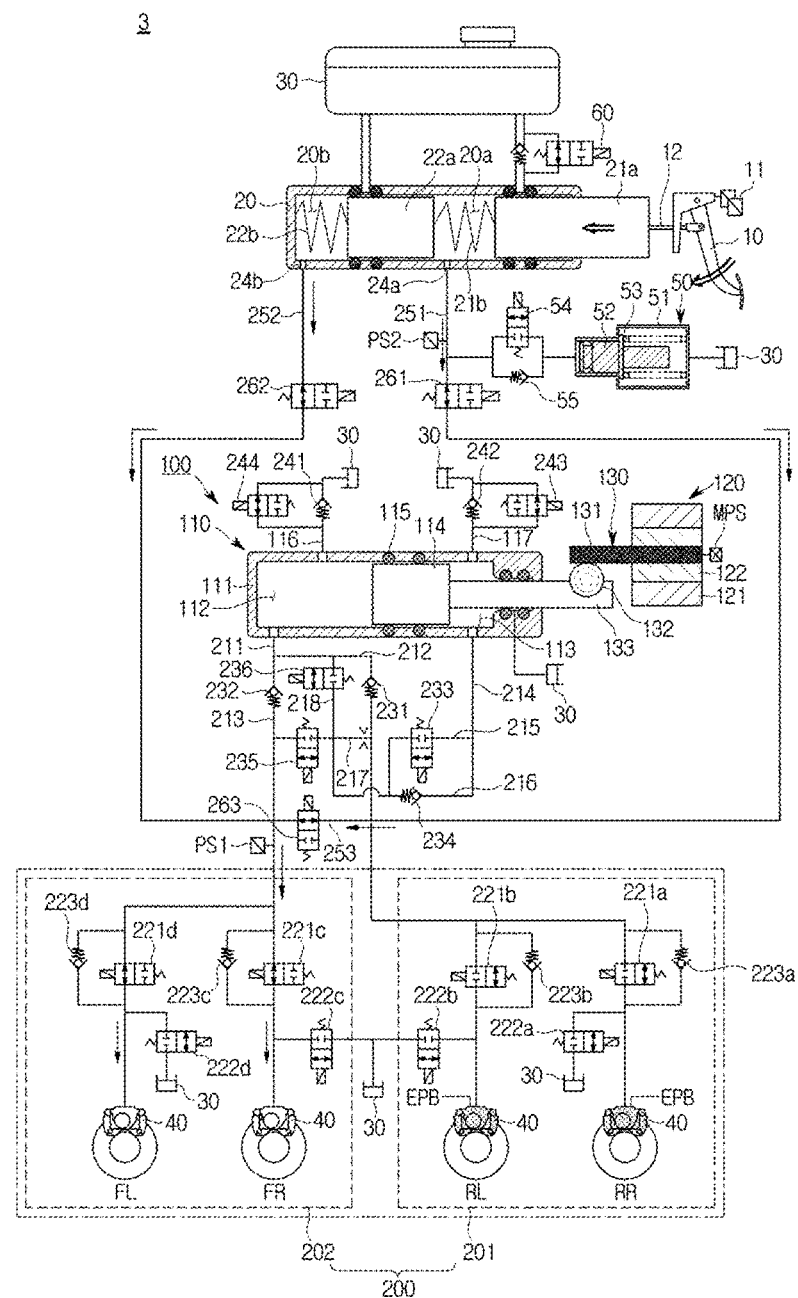

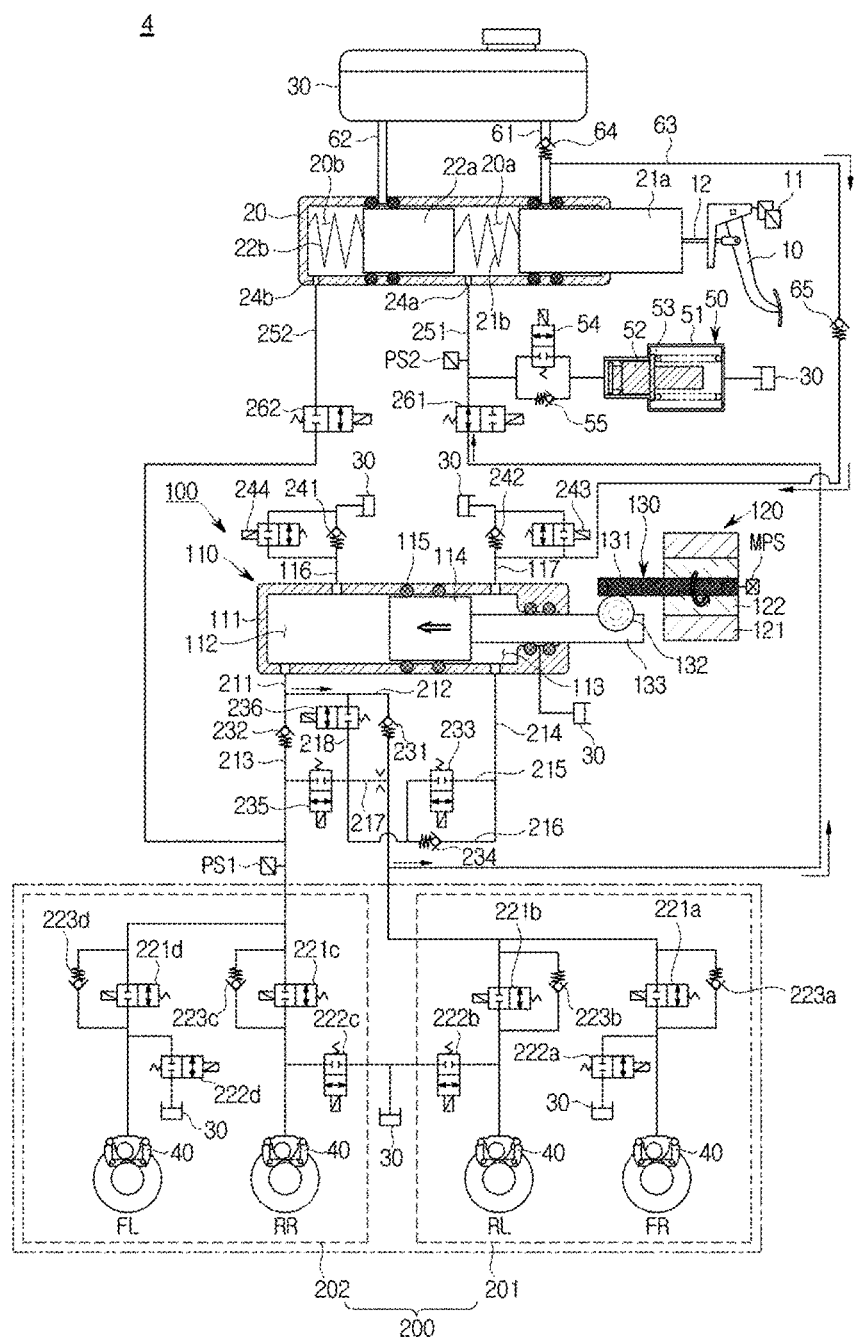
[Fig. 18]

[Fig. 19]
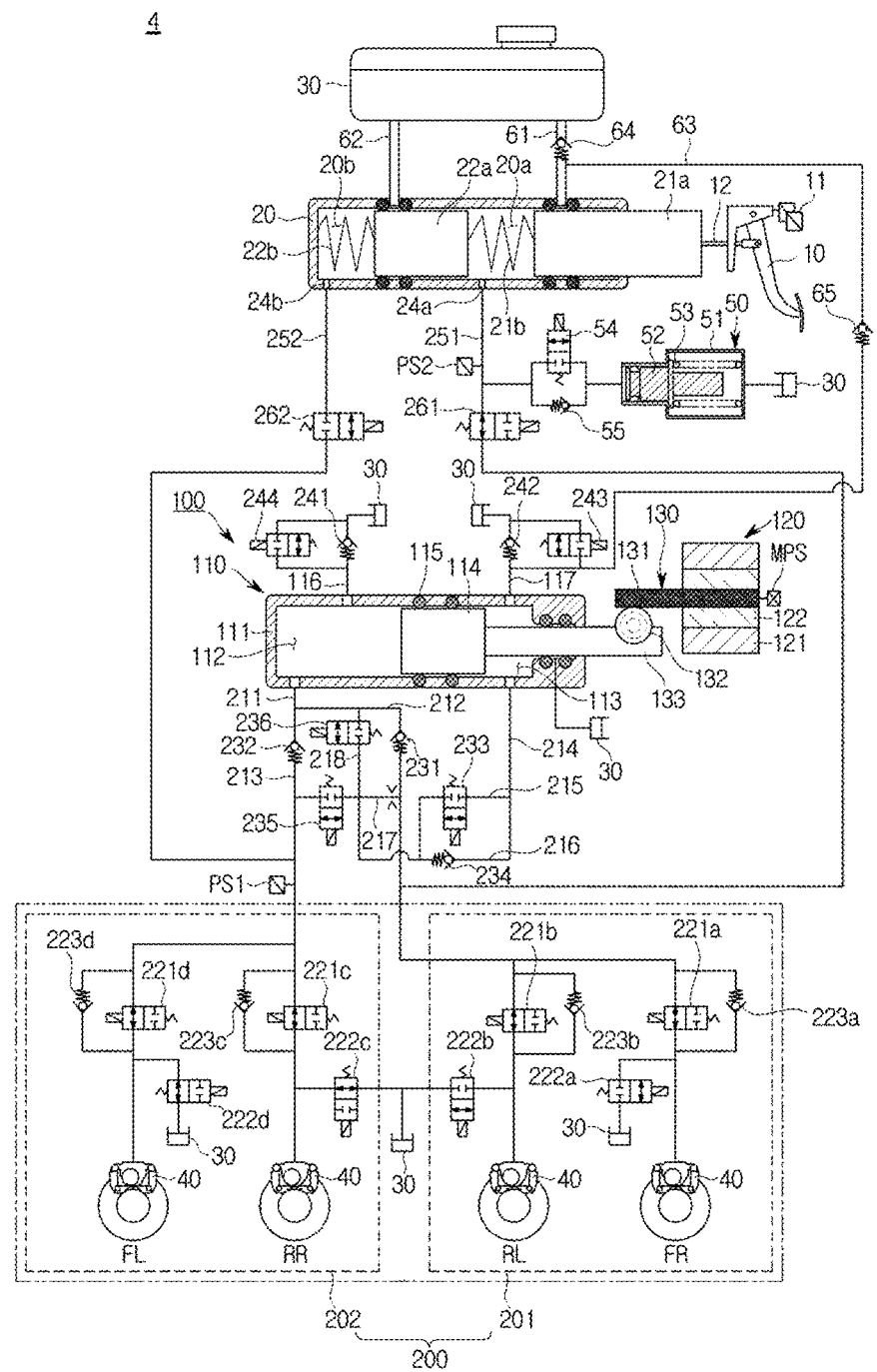

[Fig. 20]
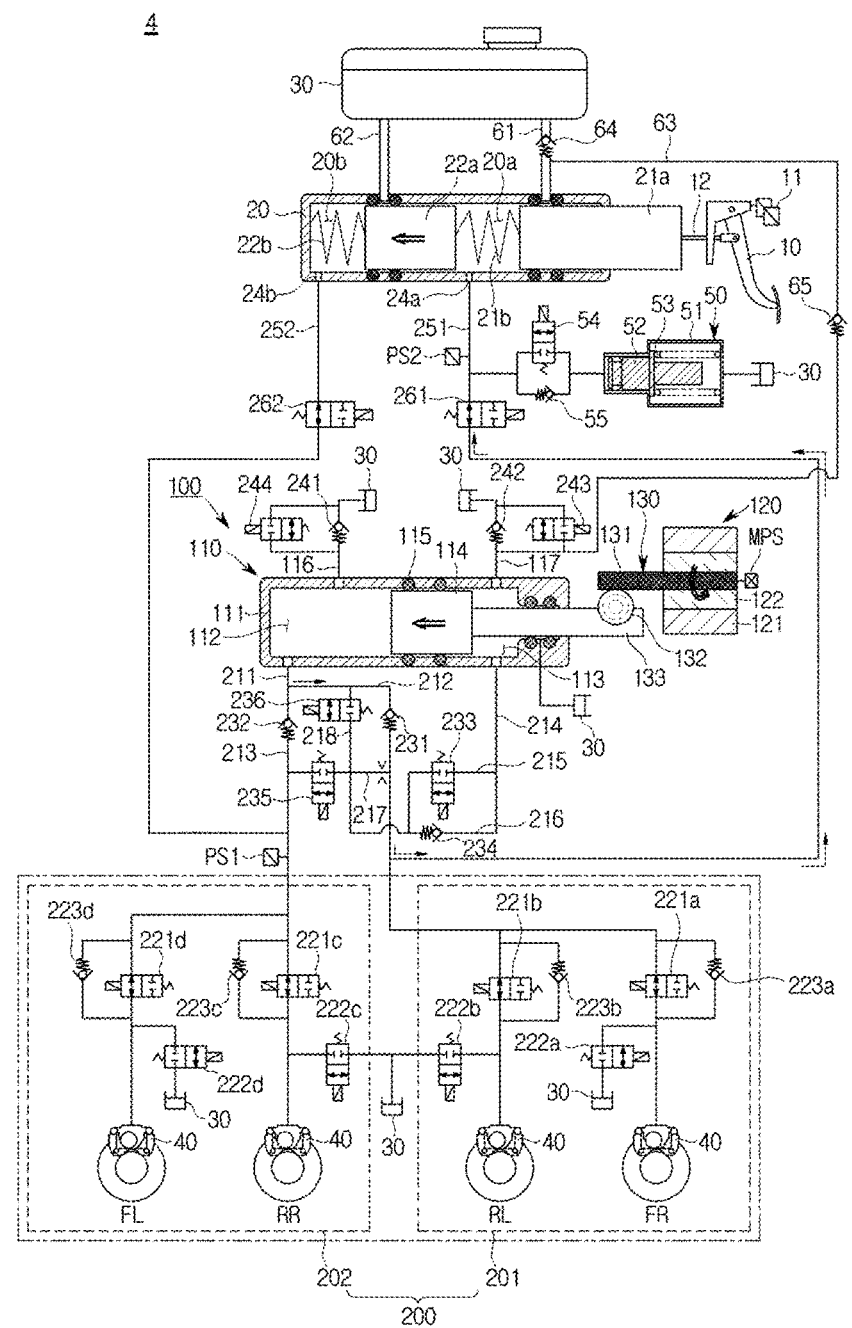

ELECTRONIC BRAKE SYSTEM

CROSS-REFERENCE TO RELATED APPLICATION(S)

This application is based on and claims priority under 35 U.S.C. § 119 to Korean Patent Application No. 10-2017-0063368, filed on May 23, 2017, Korean Patent Application No. 10-2017-0101196, filed on Aug. 9, 2017, Korean Patent Application No. 10-2017-0063377, filed on May 23, 2017 and Korean Patent Application No. 10-2018-0058163, filed on May 23, 2018 in the Korean Intellectual Property Office, the disclosures of which are incorporated by reference herein in its entirety.

BACKGROUND

1. Technical Field

The present disclosure relates to an electronic brake system, and more particularly, to an electronic brake system that generates a braking force by using an electrical signal corresponding to a displacement of a brake pedal.

2. Description of the Related Art

A vehicle is essentially equipped with a brake system for braking. Recently, various types of systems have been proposed for obtaining a more powerful and stable braking force.

Examples of the brake system include an anti-lock brake system (ABS) that prevents slippage of wheels during braking, a brake traction control system (BTCS) that prevents slippage of drive wheels during a sudden acceleration or a rapid acceleration, and an electronic stability control system (ESC) that stably maintains the running state of a vehicle by controlling the brake fluid pressure by combining the anti-lock brake system and the traction control.

In general, the electronic brake system includes a hydraulic pressure supply apparatus that receives an electric signal of a drivers braking will from a pedal displacement sensor that senses a displacement of a brake pedal when the driver depresses the brake pedal, and supplies pressure to wheel cylinders.

An electronic brake system equipped with the hydraulic pressure supply apparatus as above is disclosed in European Patent EP 2 520 473. According to the disclosed document, a hydraulic pressure supply apparatus is operated so that a motor operates according to a pedal effort of a brake pedal to generate braking pressure. At this time, the braking pressure is generated by converting the rotational force of the motor into linear motion and pressing a piston.

SUMMARY

It is an aspect of the present disclosure to provide an electronic brake system capable of flexibly providing or releasing a braking force according to various situations.

Additional aspects of the present disclosure will be set forth in part in the description which follows and, in part, will be obvious from the description, or may be learned by practice of the disclosure.

In accordance with one aspect of the present disclosure, there may be provided an electronic brake system comprising: a hydraulic pressure supply apparatus including a motor operated by an electrical signal outputted corresponding to a displacement of a brake pedal, a power converting unit for converting a rotational force of the motor into a linear movement, a cylinder block, a hydraulic piston connected to the power converting unit and movably accommodated in the cylinder block, a first pressure chamber provided at one side of the hydraulic piston and connected to one or more wheel cylinders, and a second pressure chamber provided at the other side of the hydraulic piston and connected to one or more wheel cylinders; a first dump passage communicating with the first pressure chamber and connected to a reservoir; a second dump passage communicating with the second pressure chamber and connected to the reservoir; a first dump valve provided on the first dump passage to control the flow of oil and provided as a check valve for blocking the flow of oil in the opposite direction while allowing the flow of oil in the direction to the first pressure chamber from the reservoir; a second dump valve provided on the second dump passage to control the flow of oil and provided as a check valve for blocking the flow of oil in the opposite direction while allowing the flow of oil in the direction to the second pressure chamber from the reservoir; a third dump valve provided on a bypass passage connecting an upstream side and a downstream side of the second dump valve on the second dump passage to control the flow of oil and provided as a solenoid valve for controlling the flow of oil in both directions between the reservoir and the second pressure chamber; and a fourth dump valve provided on a bypass passage connecting an upstream side and a downstream side of the first dump valve on the first dump passage to control the flow of oil and provided as a solenoid valve for controlling the flow of oil in both directions between the reservoir and the first pressure chamber.

Further, the electronic brake system may further comprise: a first hydraulic passage communicating with the first pressure chamber; a second hydraulic passage branched from the first hydraulic passage; a third hydraulic passage branched from the first hydraulic passage; a fourth hydraulic passage communicating with the second pressure chamber; a fifth hydraulic passage branched from the fourth hydraulic passage to join with the second hydraulic passage and the third hydraulic passage; a sixth hydraulic passage branched from the fourth hydraulic passage to join with the second hydraulic passage and the third hydraulic passage; a first hydraulic circuit branched from the second hydraulic passage to be connected to two wheel cylinders; and a second hydraulic circuit branched from the third hydraulic passage to be connected to two wheel cylinders.

Further, the electronic brake system may further comprise: a first control valve provided on the second hydraulic passage to control the flow of oil; a second control valve provided on the third hydraulic passage to control the flow of oil; a third control valve provided on the fifth hydraulic passage to control the flow of oil; and a fourth control valve provided on the sixth hydraulic passage to control the flow of oil.

Further, the first control valve, the second control valve, and the fourth control valve may be provided as check valves for blocking the flow of oil in the opposite direction while allowing the flow of oil in the direction to the wheel cylinders from the hydraulic pressure supply apparatus, and the fifth control valve may be provided as a solenoid valve for controlling the flow of oil in both directions between the hydraulic pressure supply apparatus and the wheel cylinders.

Further, the electronic brake system may further comprise: a seventh hydraulic passage communicating the second hydraulic passage and the third hydraulic passage; and a fifth control valve provided on the seventh hydraulic passage to control the flow of oil, wherein the fifth control valve may be provided as a solenoid valve for controlling the flow of oil in both directions between the hydraulic pressure supply apparatus and the wheel cylinders.

Further, the fifth control valve may be installed between a point where the seventh hydraulic passage joins with the third hydraulic passage and a point where the seventh hydraulic passage joins with an eighth hydraulic passage.

Further, the electronic brake system may further comprise: an eighth hydraulic passage communicating the second hydraulic passage and the seventh hydraulic passage; and a sixth control valve provided on the eighth hydraulic passage to control the flow of oil, wherein the sixth control valve may be provided as a solenoid valve for controlling the flow of oil in both directions between the hydraulic pressure supply apparatus and the wheel cylinders.

Further, a hydraulic passage joining the fifth hydraulic passage and the sixth hydraulic passage is installed between a point where the fifth control valve positioned at and a point where the second hydraulic passage joins with an seventh hydraulic passage.

Further, the electronic brake system may further comprise: a master cylinder having a first hydraulic port and a second first hydraulic port and generating a hydraulic pressure in accordance with a pedal effort applied to the brake pedal; a hydraulic control unit including a first hydraulic circuit and a second hydraulic circuit for controlling the hydraulic pressure discharged from the master cylinder or the hydraulic pressure supply apparatus to control the flow of the hydraulic pressure transmitted to the wheel cylinders provided on the respective wheels; a first backup passage connecting the first hydraulic port and the first hydraulic circuit; a second backup passage connecting the second hydraulic port and the second hydraulic circuit; a first cut valve provided on the first backup passage to control the flow of oil; a second cut valve provided on the second backup passage to control the flow of oil; an electronic control unit for controlling the motor and valves based on hydraulic pressure information and displacement information of the brake pedal; and electronic parking brakes that are provided on the wheel cylinders provided on the two rear wheels among the wheel cylinders provided on the respective wheels and that are capable of performing a braking by a motor, wherein the electronic control unit may determine whether the hydraulic pressure supply apparatus is in a normal state, generate a braking pressure to be transmitted to the respective wheel cylinders by operating the hydraulic pressure supply apparatus when the hydraulic pressure supply apparatus is determined to be in a normal state, and supply the hydraulic pressure generated from the master cylinder to the front wheels through the first backup passage and the second backup passage and perform the braking operation in cooperation with the electronic parking brakes provided on the rear wheels when the hydraulic pressure supply apparatus is determined to be in an abnormal state.

Further, the hydraulic control unit may include first to fourth inlet valves respectively provided on upper stream sides of the wheel cylinders so as to control the hydraulic pressure flowing to the wheel cylinders provided on the respective wheels; and first to fourth outlet valves for respectively controlling the flow of hydraulic pressure discharged from the wheel cylinders, wherein the inlet valves connected to the rear wheels may be switched to a closed state so that the hydraulic pressure generated from the master cylinder flows only to the front wheels when the hydraulic pressure supply apparatus is determined to be in an abnormal state.

Further, the first hydraulic circuit and the second hydraulic circuit may be configured to control one front wheel and one rear wheel, respectively.

Further, the electronic brake system may further comprise: a circuit passage connecting the first hydraulic circuit and the second hydraulic circuit and a circuit valve provided on the circuit passage to open and close the circuit passage, wherein in a case where the front wheels are controlled by one of the first hydraulic circuit and the second hydraulic circuit, the circuit valve may be opened so that the hydraulic pressure is transmitted to the wheel cylinders provided on the front wheels.

Further, the electronic brake system may further comprise: a master cylinder that includes first and second chambers formed therein to communicate with the reservoir, and first and second pistons respectively disposed in the first and second chambers, in which the first and second pistons move in accordance with a pedal effort applied to the brake pedal to discharge oil; a check valve provided on a reservoir passage connecting the reservoir and the master cylinder to allow only the flow of oil in the direction to the master cylinder from the reservoir; an inspection passage connecting the master cylinder side of the reservoir passage on which the check valve is provided and the second pressure chamber side of the second dump passage on which the second dump valve and the third dump valve are provided; and an inspection valve as a check valve provided on the inspection passage to allow only the flow of oil in the direction to the master cylinder from the reservoir.

Further, the electronic brake system may further comprise: a hydraulic control unit including a first hydraulic circuit and a second hydraulic circuit that connect the hydraulic pressure supply apparatus and the wheel cylinders to transmit the hydraulic pressure discharged from the hydraulic pressure supply apparatus to the wheel cylinders provided on the respective wheels; a first backup passage connecting a first chamber of the master cylinder and the first hydraulic circuit of the hydraulic control unit and connected to the hydraulic pressure supply apparatus on the way; a second backup passage a second chamber of the master cylinder and the second hydraulic circuit of the hydraulic control unit and connected to the hydraulic pressure supply apparatus on the way; a first cut valve provided on the first backup passage connecting the first chamber of the master cylinder and the first hydraulic circuit to control the flow of oil; a second cut valve provided on the first backup passage connecting the second chamber of the master cylinder and the second hydraulic circuit to control the flow of oil; a simulation apparatus provided on the first backup passage between the first cut valve and the master cylinder to provide a reaction force in accordance with a pedal effort applied to the brake pedal; an electronic control unit for controlling the valves based on hydraulic pressure information and displacement information of the brake pedal; a first pressure sensor installed between the first chamber of the master cylinder and the first cut valve; and a second pressure sensor installed on the first hydraulic circuit or the second hydraulic circuit, wherein the hydraulic control unit may operate the hydraulic pressure supply apparatus in a state of closing the second cut valve, the third dump valve, and the first and second hydraulic circuits to form hydraulic pressure in the first pressure chamber, transmit the hydraulic pressure generated in the first pressure chamber to the master cylinder through the first backup passage while preventing the hydraulic pressure from being transmitted to the reservoir by closing the inspection passage with the third dump valve, and determine that a leak of the simulation apparatus occurs when a loss occurs by analyzing a measured value of the first pressure sensor.

Further, the electronic brake system may further comprise: a hydraulic control unit including a first hydraulic circuit and a second hydraulic circuit that transmit the hydraulic pressure discharged from the hydraulic pressure supply apparatus to the wheel cylinders provided on the respective wheels and have inlet valves provided on hydraulic passages connecting the hydraulic pressure supply apparatus and the wheel cylinders and outlet valves provided on passages connecting the wheel cylinders and the reservoir; a first backup passage connecting a first chamber of the master cylinder and the first hydraulic circuit of the hydraulic control unit and connected to the hydraulic pressure supply apparatus on the way; a second backup passage a second chamber of the master cylinder and the second hydraulic circuit of the hydraulic control unit and connected to the hydraulic pressure supply apparatus on the way; a first cut valve provided on the first backup passage connecting the first chamber of the master cylinder and the first hydraulic circuit to control the flow of oil; a second cut valve provided on the first backup passage connecting the second chamber of the master cylinder and the second hydraulic circuit to control the flow of oil; an electronic control unit for controlling the valves based on hydraulic pressure information and displacement information of the brake pedal; a first pressure sensor installed between the first chamber of the master cylinder and the first cut valve; and a second pressure sensor installed on the first hydraulic circuit or the second hydraulic circuit, wherein the electronic control unit, in a state in which the hydraulic pressure in the second hydraulic circuit of the hydraulic control unit and a partial hydraulic pressure in the second backup passage are removed by closing the second cut valve and opening the outlet valves of the second hydraulic circuit connected to the second backup passage, may operate the hydraulic pressure supply apparatus to form a pressure in the first pressure chamber and to form a pressure in the first chamber of the master cylinder by transmitting the hydraulic pressure generated in the first pressure chamber through the first backup passage, and determine whether the second piston of the master cylinder is stuck by analyzing a measured value of the second pressure sensor.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 1 is a hydraulic circuit diagram showing a non-braking state of an electronic brake system according to an embodiment of the present disclosure;

FIG. 2 is an enlarged view showing a hydraulic pressure providing unit according to an embodiment of the present disclosure;

FIG. 3 is a hydraulic circuit diagram showing a situation in which a braking pressure is provided in a low pressure mode while a hydraulic piston of an electronic brake system according to an embodiment of the present disclosure moves forward;

FIG. 4 is a hydraulic circuit diagram showing a situation in which a braking pressure is provided in a high pressure mode while a hydraulic piston of an electronic brake system according to an embodiment of the present disclosure moves forward;

FIG. 5 is a hydraulic circuit diagram showing a situation in which a braking pressure is provided in a low pressure mode while a hydraulic piston of an electronic brake system according to an embodiment of the present disclosure moves backward;

FIG. 6 is a hydraulic circuit diagram showing a situation in which a braking pressure is provided in a high pressure mode while a hydraulic piston of an electronic brake system according to an embodiment of the present disclosure moves backward;

FIG. 7 is a hydraulic circuit diagram showing a situation in which a braking pressure is released in a high pressure mode while a hydraulic piston of an electronic brake system according to an embodiment of the present disclosure moves backward;

FIG. 8 is a hydraulic circuit diagram showing in which a braking pressure is released in a low pressure mode while a hydraulic piston of an electronic brake system according to an embodiment of the present disclosure moves backward;

FIG. 9 is a hydraulic circuit diagram showing a situation in which a braking pressure is released while a hydraulic piston of an electronic brake system according to an embodiment of the present disclosure moves forward;

FIG. 10 is a hydraulic circuit diagram showing a situation in which an electronic brake system according to an embodiment of the present disclosure is operated in an ABS mode and a braking is selectively performed while a hydraulic piston moves forward;

FIG. 11 is a hydraulic circuit diagram showing a situation in which an electronic brake system according to an embodiment of the present disclosure is operated in an ABS mode and a braking is selectively performed while a hydraulic piston moves backward;

FIG. 12 is a hydraulic circuit diagram showing a state in which an electronic brake system according to an embodiment of the present disclosure is operated abnormally;

FIG. 13 is a hydraulic circuit diagram showing a state in which an electronic brake system according to an embodiment of the present disclosure is operated in a dump mode;

FIG. 14 is a hydraulic circuit diagram showing a state in which an electronic brake system according to an embodiment of the present disclosure is operated in a balance mode;

FIG. 15 is a hydraulic circuit diagram showing a state in which an electronic brake system according to an embodiment of the present disclosure is operated in an inspection mode;

FIG. 16 is a hydraulic circuit diagram showing a situation in which a braking pressure is provided when a hydraulic pressure supply apparatus of an electronic brake system according to another embodiment of the present disclosure is in an abnormal state;

FIG. 17 is a hydraulic circuit diagram showing a situation in which a braking pressure is provided when a hydraulic pressure supply apparatus of an electronic brake system according to another embodiment of the present disclosure is in an abnormal state;

FIG. 18 is a hydraulic circuit diagram showing a state in which an electronic brake system according to another embodiment of the present disclosure inspects whether a simulator valve is leaking;

FIG. 19 is a hydraulic circuit diagram showing a preparation state in which an electronic brake system according to another embodiment of the present disclosure inspects whether a master cylinder is stuck; and FIG. 20 is a hydraulic circuit diagram showing an inspection state in which an electronic brake system according to another embodiment of the present disclosure inspects whether a master cylinder is stuck.

DETAILED DESCRIPTION

Hereinafter, embodiments of the present disclosure will be described in detail with reference to the accompanying drawings. The following embodiments are provided to fully convey the spirit of the present disclosure to a person having ordinary skill in the art to which the present disclosure belongs. The present disclosure is not limited to the embodiments shown herein but may be embodied in other forms. The drawings are not intended to limit the scope of the present disclosure in any way, and the size of components may be exaggerated for clarity of illustration.

FIG. 1 is a hydraulic circuit diagram showing a non-braking state of an electronic brake system according to an embodiment of the present disclosure.

Referring to FIG. 1, an electronic brake system 1 typically includes a master cylinder 20 for generating a hydraulic pressure, a reservoir 30 coupled to an upper portion of the master cylinder 20 to store oil, an input rod 12 for pressing the master cylinder 20 in accordance with a pedal effort of the brake pedal 10, wheel cylinders 40 that receive the hydraulic pressure and perform braking of each of wheels RR, RL, FR and FL, a pedal displacement sensor 11 for sensing the displacement of the brake pedal 10, and a simulation apparatus 50 for providing a reaction force in accordance with the pedal effort of the brake pedal 10.

The master cylinder 20 may be configured to include at least one chamber to generate hydraulic pressure. As an example, the master cylinder 20 is configured to have two chambers, and each chamber is provided with a first piston 21a and a second piston 22a. The first piston 21a may be connected to the input rod 12, and the master cylinder 20 may have first and second hydraulic pressure ports 24a and 24b, respectively, through which hydraulic pressure is discharged from the two chambers.

The master cylinder 20 may ensure safety in case of failure by having the two chambers. For example, one chamber of the two chambers may be connected to the front right wheel FR and the rear left wheel RL of a vehicle, and the other chamber may be connected to the front left wheel FL and the rear right wheel RR. In this way, by independently configuring the two chambers, it is possible to brake the vehicle even if one of the master chambers fails.

Alternatively, unlike the drawing, one of the two chambers may be connected to the two front wheels FR and FL, and the other chamber may be connected to the two rear wheels RR and RL. In addition, one of the two chambers may be connected to the front left wheel FL and the rear left wheel RL, and the other chamber may be connected to the rear right wheel RR and the front right wheel FR. That is, the positions of the wheels connected to the chambers of the master cylinder 20 may be variously configured.

A first spring 21b may be provided between the first piston 21a and the second piston 22a of the master cylinder 20, and a second spring 22b may be provided between the second piston 22a and an end of the master cylinder 20.

The first spring 21b and the second spring 22b are provided in the two chambers, respectively. As the displacement of the brake pedal 10 changes, the first piston 21a and the second piston 22a are compressed, and thus the elastic force is stored in the first spring 21b and the second spring 22b. When a force pushing the pistons becomes smaller than the elastic force of the springs, the first and second pistons 21a and 22a may be pushed to return to their original positions by using the elastic force stored in the first spring 21b and the second spring 22b.

The input rod 12 for pressing the first piston 21a of the master cylinder 20 may be brought into close contact with the first piston 21a. That is, a gap between the master cylinder 20 and the input rod 12 may not exist. Therefore, when the brake pedal 10 is depressed, the master cylinder 20 may be directly pressed without a pedal invalid stroke section.

The simulation apparatus 50 may be connected to a first backup passage 251, which will be described later, to provide a reaction force in accordance with the pedal effort of the brake pedal 10. The reaction force is provided as much as compensating a driver's pedal effort so that the driver may precisely regulate the braking force as intended.

As shown in FIG. 1, the simulation apparatus 50 includes a pedal simulator that has a simulation chamber 51 provided to store the oil flowing out from the first hydraulic pressure port 24a of the master cylinder 20, a pedal simulator having a reaction force piston 52 provided in a simulation chamber 51 and a reaction force spring 53 elastically supporting the reaction force piston 52, and a simulator valve 54 connected to a front portion of the simulation chamber 51.

The reaction force piston 52 and the reaction force spring 53 are installed so as to have a certain range of displacement in the simulation chamber 51 by the oil introduced into the simulation chamber 51.

The reaction force spring 53 shown in the drawing is only one embodiment capable of providing an elastic force to the reaction force piston 52 and may include various embodiments capable of storing the elastic force by deforming the shape. For example, it may include various members capable of storing an elastic force by being made of a material such as rubber or having a coil or a plate shape.

The simulator valve 54 may be provided on a flow passage connecting a front end of the simulation chamber 51 and the first hydraulic pressure port 24a of the master cylinder 20. For example, the simulator valve 54 may be provided on a flow passage connecting the first backup passage 251 connected to the first hydraulic pressure port 24a and the front end of the simulation chamber 51. Accordingly, the oil discharged from the first hydraulic pressure port 24a flows into the simulation chamber 51 through the simulator valve 54.

Herein, the plurality of reservoirs 30 is shown in FIG. 1, and each reservoir 30 is denoted by the same reference numeral. However, these reservoirs may be provided with the same parts or may be provided with different parts. For example, the reservoir 30 connected to the simulation apparatus 50 may be the same as the reservoir 30 connected to the master cylinder 20 or may be a reservoir capable of storing oil separately from the reservoir 30 connected to the master cylinder 20.

The simulator valve 54 may be composed of a normally closed type solenoid valve that is normally kept closed. The simulator valve 54 may be opened when a driver presses the brake pedal 10 to deliver the oil in a first master chamber 20a to the simulation chamber 51.

Further, a simulator check valve 55 may be provided between the master cylinder 20 and the pedal simulator in parallel with the simulator valve 54. The simulator check valve 55 may allow the oil in the simulation chamber 51 to flow into the first master chamber 20a, but may block the oil in the first master chamber 20a from flowing to the simulation chamber 51 through a flow passage on which the simulator check valve 55 is installed. A quick return of the first piston 21a may be ensured since oil may be supplied into the first master chamber 20a through the simulator check valve 55 when the brake pedal 10 is released.

The operation of the pedal simulation apparatus 50 is as follows. When a driver depresses the brake pedal 10, the oil in the simulation chamber 51 is transmitted to the reservoir 30 through the simulator valve 54 as the reaction force piston 52 of the pedal simulator pushes the reaction force spring 53, and the driver is provided with a sense of pedaling in this process. On the contrary, when the driver releases the pedal effort applied to the brake pedal 10, the reaction force spring 53 pushes the reaction force piston 52 to be returned to the original state, and the oil in the reservoir 30 may flow into the simulation chamber 51 to fully fill the inside of the simulation chamber 51. Further, the oil discharged from the simulation chamber 51 flows into the first master chamber 20a through the flow passage on which the simulator valve 54 is installed and the flow passage on which the simulator check valve 55 is installed.

As such, since the inside of the simulation chamber 51 is always filled with oil, the friction of the reaction force piston 52 is minimized during operation of the simulation apparatus 50 so that the durability of the simulation apparatus 50 is improved and the inflow of foreign matter from the outside is blocked.

The electronic brake system 1 according to an embodiment of the present disclosure may include a hydraulic pressure supply apparatus 100 which mechanically operates by receiving an electric signal of a drivers braking will from the pedal displacement sensor 11 which detects the displacement of the brake pedal 10, a hydraulic control unit 200 composed of first and second hydraulic circuits 201 and 202 for controlling the flow of hydraulic pressure transmitted to the wheel cylinders 40 provided on the two wheels FR and RL or FL and RR, a first cut valve 261 provided on the first backup passage 251 that connects the first hydraulic pressure port 24a and the first hydraulic circuit 201 to control the flow of hydraulic pressure, a second cut valve 262 provided on a second backup passage 252 that connects the second hydraulic pressure port 24b and the second hydraulic circuit 202 to control the flow of hydraulic pressure, and an electronic control unit (ECU; not shown) for controlling the hydraulic pressure supply apparatus 100 and valves 54, 60, 221a, 221b, 221c, 221d, 222a, 222b, 222c, 222d, 233, 235, 236, 243 and 244 based on hydraulic pressure information and pedal displacement information.

The hydraulic pressure supply apparatus 100 may include a hydraulic pressure providing unit 110 for providing oil pressure delivered to the wheel cylinders 40, a motor 120 for generating a rotational force by an electrical signal of the pedal displacement sensor 11, and a power converting unit 130 for converting the rotational motion of the motor 120 into a linear motion and transmitting the linear motion to the hydraulic pressure providing unit 110. The hydraulic pressure providing unit 110 may be operated by the pressure supplied from a high pressure accumulator, riot by the driving force supplied from the motor 120.

Next, the hydraulic pressure providing unit 110 according to an embodiment of the present disclosure will be described with reference to FIG. 2. FIG. 2 is an enlarged view showing the hydraulic pressure providing unit 110 according to an embodiment of the present disclosure.

The hydraulic pressure providing unit 110 includes a cylinder block 111 in which a pressure chamber for receiving and storing oil is formed, a hydraulic piston 114 accommodated in the cylinder block 111, sealing members 115 (115a, 115b) provided between the hydraulic piston 114 and the cylinder block 111 to seal pressure chambers, and a drive shaft 133 connected to the rear end of the hydraulic piston 114 to transmit the power output from the power converting unit 130 to the hydraulic piston 114.

The pressure chambers may include a first pressure chamber 112 positioned forward (forward direction, leftward direction in the drawing) of the hydraulic piston 114 and a second pressure chamber 113 positioned rearward (rearward direction, rightward in the drawing) of the hydraulic piston 114. That is, the first pressure chamber 112 is partitioned by the cylinder block 111 and the front end of the hydraulic piston 114 and is provided such that the volume thereof changes according to the movement of the hydraulic piston 114, and the second pressure chamber 113 is partitioned by the cylinder block 111 and the rear end of the hydraulic piston 114 and is provided such that the volume thereof changes according to the movement of the hydraulic piston 114.

The first pressure chamber 112 is connected to a first hydraulic passage 211 through a first communication hole 111a formed at the rear side of the cylinder block 111 and is connected to a fourth hydraulic passage 214 through a second communication hole 111b formed at the front side of the cylinder block 111.

The first hydraulic passage 211 connects the first pressure chamber 112 and the first and second hydraulic circuits 201 and 202. In addition, the first hydraulic passage 211 is branched to a second hydraulic passage 212 communicating with the first hydraulic circuit 201 and a third hydraulic passage 213 communicating with the second hydraulic circuit 202.

The fourth hydraulic passage 214 connects the second pressure chamber 113 and the first and second hydraulic circuits 201 and 202. In addition, the fourth hydraulic passage 214 is branched to a fifth hydraulic passage 215 communicating with the first hydraulic circuit 201 and a sixth hydraulic passage 216 communicating with the second hydraulic circuit 202.

The sealing members 115 include a piston sealing member 115a provided between the hydraulic piston 114 and the cylinder block 111 to seal a gap between the first pressure chamber 112 and the second pressure chamber 113, and a drive shaft sealing member 115b provided between the drive shaft 133 and the cylinder block 111 to seal a gap between the second pressure chamber 113 and of the cylinder block 111. That is, the hydraulic pressure or the negative pressure of the first pressure chamber 112 generated by the forward or backward movement of the hydraulic piston 114 may not be leaked to the second pressure chamber 113 by blocking by the piston sealing member 115a, and may be transmitted to the first and fourth hydraulic passages 211 and 214. In addition, the hydraulic pressure or the negative pressure of the second pressure chamber 113 generated by the forward or backward movement of the hydraulic piston 114 may not be leaked to the cylinder block 111 by blocking by the drive shaft sealing member 115b.

The first and second pressure chambers 112 and 113 are connected to the reservoir 30 by dump passages 116 and 117, respectively, so that the first and second pressure chambers 112 and 113 may receive and store oil from the reservoir 30, or the oil in the first pressure chamber 112 or the second pressure chamber 113 may be delivered to the reservoir 30. For example, the dump passages 116 and 117 may include the first dump passage 116 branched from the first pressure chamber 112 and connected to the reservoir 30, and the second dump passage 117 branched from the second pressure chamber 113 and connected to the reservoir 30, respectively.

Further, a first communication hole 111a communicating with the first hydraulic passage 211 may be formed at a front of the first pressure chamber 112 and a second communication hole 111a communicating with the fourth hydraulic passage 214 may be formed at a rear of the first pressure chamber 112. A third communication hole 111c communicating with the first dump passage 116 may be further formed in the first pressure chamber 112, and a fourth communication hole 111d communicating with the second dump passage 117 may be formed in the second pressure chamber 113.

Flow passages 211 to 218, and valves 231 to 236 and 241 to 244, which are connected to the first pressure chamber 112 and the second pressure chamber 113, will be described below with reference to FIG. 1.

The first hydraulic passage 211 may be branched into the second hydraulic passage 212 and the third hydraulic passage 213 to communicate with both the first hydraulic circuit 201 and the second hydraulic circuit 202. For example, the second hydraulic passage 212 may communicate with the first hydraulic circuit 201, and the third hydraulic passage 213 may communicate with the second hydraulic circuit 202. Accordingly, the hydraulic pressure may be transmitted to the first hydraulic circuit 201 and the second hydraulic circuit 202 by the forward movement of the hydraulic piston 114.

Further, the electronic brake system 1 according to an embodiment of the present disclosure may include a first control valve 231 and a second control valve 232 provided on the second and third hydraulic passages 212 and 213, respectively, to control the flow of oil.

The first and second control valves 231 and 232 may be provided as check valves that allow only the oil flow in the direction from the first pressure chamber 112 to the first or second hydraulic circuit 201 or 202 and block the oil flow in the opposite direction. That is, the first or second control valve 231 or 232 may allow the hydraulic pressure in the first pressure chamber 112 to be transmitted to the first or second hydraulic circuit 201 or 202, but may prevent the hydraulic pressure in the first or second hydraulic circuit 201 or 202 from being leaked to the first pressure chamber 112 through the second or third hydraulic passage 212 or 213.

The fourth hydraulic passage 214 may be branched into the fifth hydraulic passage 215 and the sixth hydraulic passage 216 to communicate with both the first hydraulic circuit 201 and the second hydraulic circuit 202. For example, the fifth hydraulic passage 215 branched from the fourth hydraulic passage 214 may communicate with the first hydraulic circuit 201, and the sixth hydraulic passage 216 branched from the fourth hydraulic passage 214 may communicate with the second hydraulic circuit 202. Accordingly, the hydraulic pressure may be transmitted to both the first hydraulic circuit 201 and the second hydraulic circuit 202 by the backward movement of the hydraulic piston 114.

Further, the electronic brake system 1 according to an embodiment of the present disclosure may include a third control valve 233 provided on the fifth hydraulic passage 215 to control the flow of oil, and a fourth control valve 234 provided on the sixth hydraulic passage 216 to control the flow of oil.

The third control valve 233 may be provided as a bidirectional control valve for controlling the oil flow between the second pressure chamber 113 and the first hydraulic circuit 201. In addition, the third control valve 233 may be provided as a normally closed type solenoid valve which is normally closed and operates to be opened when receiving an open signal from the electronic control unit.

The fourth control valve 234 may be provided as a check valve that allows only the oil flow in the direction from the second pressure chamber 113 to the second hydraulic circuit 202 and blocks the oil flow in the opposite direction. That is, the fourth control valve 234 may prevent the hydraulic pressure in the second hydraulic circuit 202 from being leaked to the second pressure chamber 113 through the sixth hydraulic passage 216 and the fourth hydraulic passage 214.

Further, the electronic brake system 1 according to an embodiment of the present disclosure may include a fifth control valve 235 provided on a seventh hydraulic passage 217 that connects the second hydraulic passage 212 and the third hydraulic passage 213 to control the flow of oil, and a sixth control valve 236 provided on an eighth hydraulic passage 218 that connects the second hydraulic passage 212 and the seventh hydraulic passage 217 to control the flow of oil. The fifth control valve 235 and the sixth control valve 236 may be provided as a normally closed type solenoid valve which is normally closed and operates to be opened when receiving an open signal from the electronic control unit.

The fifth control valve 235 and the sixth control valve 236 may operate to be opened when an abnormality occurs in the first control valve 231 or the second control valve 232 so that the hydraulic pressure in the first pressure chamber 112 is transmitted to both the first hydraulic circuit 201 and the second hydraulic circuit 202.

Further, the fifth control valve 235 and the sixth control valve 236 may operate to be opened when the hydraulic pressure in the wheel cylinders 40 is exited and sent to the first pressure chamber 112. This is because the first control valve 231 and the second control valve 232 provided on the second hydraulic passage 212 and the third hydraulic passage 213 are provided as check valves allowing only one directional oil flow.

The fifth control valve 235 and an orifice for reducing pulsation in which the reference numeral is not indicated may be provided on the seventh hydraulic passage 217.

Further, the electronic brake system 1 according to an embodiment of the present disclosure may further include a first dump valve 241 and a second dump valve 242 provided on the first dump passage 116 and the second dump passage 117, respectively, to control the flow of oil. The first and second dump valves 241 and 242 may be provided as check valves that are opened only in the direction from the reservoir 30 to the first or second pressure chamber 112 or 113 and closed in the opposite direction. That is, the first dump valve 241 may be a check valve that allows the oil to flow from the reservoir 30 to the first pressure chamber 112 while blocking the flow of oil from the first pressure chamber 112 to the reservoir 30, and the second dump valve 242 may be a check valve that allows the oil to flow from the reservoir 30 to the second pressure chamber 113 while blocking the flow of oil from the second pressure chamber 113 to the reservoir 30.

The first dump passage 116 may include a bypass passage, and a fourth dump valve 244 for controlling the flow of oil between the first pressure chamber 112 and the reservoir 30 may be installed on the bypass passage.

The fourth dump valve 244 may be provided as a solenoid valve capable of controlling the bidirectional flow, and may also be provided as a normally open type solenoid valve that is opened in a normal state and operates to be closed when receiving a close signal from the electronic control unit.

Further, the second dump passage 117 may include a bypass passage, and a third dump valve 243 for controlling the flow of oil between the second pressure chamber 113 and the reservoir 30 may be installed on the bypass passage.

The third dump valve 243 may be provided as a solenoid valve capable of controlling the bidirectional flow, and may also be provided as a normally open type solenoid valve that is opened in a normal state and operates to be closed when receiving a close signal from the electronic control unit.

The hydraulic pressure providing unit 110 of the electronic brake system 1 according to an embodiment of the present disclosure may operate in a double acting manner.

That is, the hydraulic pressure generated in the first pressure chamber 112 as the hydraulic piston 114 advances is transmitted to the first hydraulic circuit 201 through the first hydraulic passage 211 and the second hydraulic passage 212 to operate the wheel cylinders 40 installed on the front right wheel FR and the rear left wheel RL, and is transmitted to the second hydraulic circuit 202 through the first hydraulic passage 211 and the third hydraulic passage 213 to operate the wheel cylinders 40 installed on the rear right wheel RR and the front left wheel FL.

Likewise, the hydraulic pressure generated in the second pressure chamber 113 as the hydraulic piston 114 moves backward is transmitted to the first hydraulic circuit 201 through the fourth hydraulic passage 214 and the fifth hydraulic passage 215 to operate the wheel cylinders 40 installed on the front light wheel FR and the rear left wheel RL, and is transmitted to the second hydraulic circuit 202 through the fourth hydraulic passage 214 and the sixth hydraulic passage 216 to operate the wheel cylinders 40 installed on the rear right wheel RR and the front left wheel FL.

Further, the negative pressure generated in the first pressure chamber 112 while the hydraulic piston 114 moves backward may suck oil in the wheel cylinders 40 installed on the front right wheel FR and the rear left wheel RL and transmit the oil to the first pressure chamber 112 through the first hydraulic circuit 201, the second hydraulic passage 212 and the first hydraulic passage 211, and may suck oil in the wheel cylinders 40 installed on the rear right wheel RR and the front left wheel FL and transmit the oil to the first pressure chamber 112 through the second hydraulic circuit 202, the third hydraulic passage 213 and the first hydraulic passage 211.

Next, the motor 120 and the power converting unit 130 of the hydraulic pressure supply apparatus 100 will be described.

The motor 120 which is a device for generating a rotational force by a signal output from an electronic control unit (ECU) (not shown) may generate a rotational force in a forward or reverse direction by including a stator 121 and a rotor 122. The rotational angular velocity and rotation angle of the motor 120 may be precisely controlled. Since the motor 120 is a well-known technology, a detailed description thereof will be omitted.

The electronic control unit controls the valves 54, 60, 221a, 221b, 221c, 221d, 222a, 222b, 222c, 222d, 233, 235, 236, 243 and 244 included in the electronic brake system 1 of the present disclosure, including the motor 120, which will be described later. The operation in which a plurality of valves is controlled according to the displacement of the brake pedal 10 will be described later.

The driving force of the motor 120 causes the displacement of the hydraulic piston 114 through the power converting unit 130, and the hydraulic pressure generated by the sliding movement of the hydraulic piston 114 in the pressure chambers is transmitted to the wheel cylinders 40 installed on the respective wheels RR, RL, FR and FL through the first and second hydraulic passages 211 and 212.

The power converting unit 130 which is a device for converting a rotational force into a linear motion may include a worm shaft 131, a worm wheel 132, and the drive shaft 133, for example.

The worm shaft 131 may be integrally formed with a rotation shaft of the motor 120, and rotates the worm wheel 132 by forming a worm that engages with the worm wheel 132 on the outer circumferential surface thereof. The worm wheel 132 is coupled to be engaged with the drive shaft 133 to move the drive shaft 133 linearly, and the drive shaft 133 is connected to the hydraulic piston 114 to slide the hydraulic piston 114 in the cylinder block 111.

The above operations may be described again as follows. A signal sensed by the pedal displacement sensor 11 as a displacement occurs in the brake pedal 10 is transmitted to the electronic control unit (ECU) (not shown), and the electronic control unit drives the motor 120 in one direction to rotate the worm shaft 131 in one direction. The rotational force of the worm shaft 131 is transmitted to the drive shaft 133 via the worm wheel 132, and the hydraulic piston 114 connected to the drive shaft 133 moves forward to generate a hydraulic pressure to the first pressure chamber 112.

On the contrary, when the pedal effort on the brake pedal 10 is released, the electronic control unit drives the motor 120 in the opposite direction to rotate the worm shaft 131 in the opposite direction. Accordingly, the worm wheel 132 also rotates in the opposite direction and the hydraulic piston 114 connected to the drive shaft 133 returns (moves backward), thereby generating a negative pressure in the first pressure chamber 112.

On the other hand, the hydraulic pressure and the negative pressure may be generated in a direction opposite to the above. That is, a signal sensed by the pedal displacement sensor 11 as a displacement occurs in the brake pedal 10 is transmitted to the electronic control unit (ECU) (not shown), and the electronic control unit drives the motor 120 in the opposite direction to rotate the worm shaft 131 in the opposite direction. The rotational force of the worm shaft 131 is transmitted to the drive shaft 133 via the worm wheel 132 and the hydraulic piston 114 connected to the drive shaft 133 moves backward, thereby generating a hydraulic pressure in the second pressure chamber 113.

On the contrary, when the pedal effort on the brake pedal 10 is released, the electronic control unit drives the motor 120 in one direction so that the worm shaft 131 rotates in one direction. Accordingly, the worm wheel 132 also rotates in the opposite direction and the hydraulic piston 114 connected to the drive shaft 133 returns (advances), thereby generating a negative pressure in the second pressure chamber 113.

As such, the hydraulic pressure supply apparatus 100 performs the function of transmitting the hydraulic pressure to the wheel cylinders 40 or sucking and transmitting the hydraulic pressure to the reservoir 30 in accordance with the rotational direction of the rotational force generated from the motor 120.

When the motor 120 rotates in one direction, a hydraulic pressure may be generated in the first pressure chamber 112 or a negative pressure may be generated in the second pressure chamber 113. In such a case, whether to brake by using the hydraulic pressure or to release the braking by using the negative pressure may be determined by controlling the valves 54, 60, 221a, 221b, 221c, 221d, 222a, 222b, 222c, 222d, 233, 235, 236, 243 and 244.

Although not shown in the drawings, the power converting unit 130 may be constituted by a ball screw nut assembly. The power converting unit 130 may include, for example, a screw integrally formed with the rotation shaft of the motor 120 or connected to rotate together with the rotation shaft of the motor 120, and a ball nut that is screwed with the screw in a limited rotation state arid linearly moves according to the rotation of the screw. The hydraulic piston 114 is connected to the ball nut of the power converting unit 130 and presses the pressure chambers by the linear movement of the ball nut. The structure of such a ball screw nut assembly is a known apparatus for converting a rotational motion into a linear motion, and thus a detailed description thereof will be omitted.

It should be understood that the power converting unit 130 according to an embodiment of the present disclosure may adopt any structure other than the structure of the ball screw nut assembly as long as the structure may convert a rotational motion into a linear motion.

Further, the electronic brake system 1 according to an embodiment of the present disclosure may further include the first and second backup passages 251 and 252 capable of directly supplying the oil discharged from the master cylinder 20 to the wheel cylinders 40 when operating abnormally.

The first cut valve 261 for controlling the flow of oil may be provided on the first backup passage 251 and the second cut valve 262 for controlling the flow of oil may be provided on the second backup passage 252. Further, the first backup passage 251 may connect the first hydraulic pressure port 24a to the first hydraulic circuit 201, and the second backup passage 252 may connect the second hydraulic pressure port 24b and the second hydraulic circuit 202.

The first and second cut valves 261 and 262 may be provided as normally open type solenoid valves that are opened in a normal state and operate to be dosed when receiving a close signal from the electronic control unit.

Next, the hydraulic control unit 200 according to an embodiment of the present disclosure will be described with reference to FIG. 1.

The hydraulic control unit 200 may include the first hydraulic circuit 201 and the second hydraulic circuit 202, each of which receives a hydraulic pressure and controls two wheels. For example, the first hydraulic circuit 201 may control the front right wheel FR and the rear left wheel RL, and the second hydraulic circuit 202 may control the front left wheel FL and the rear right wheel RR. The wheel cylinders 40 are provided on the respective wheels FR, FL, RR and RL to receive the hydraulic pressure and perform braking.

The first hydraulic circuit 201 is connected to the first hydraulic passage 211 and the second hydraulic passage 212 and is supplied with the hydraulic pressure from the hydraulic pressure supply apparatus 100, and the second hydraulic passage 212 is branched into two flow passages connected to the front right wheel FR and the rear left wheel RL. Likewise, the second hydraulic circuit 202 is connected to the first hydraulic passage 211 and the third hydraulic passage 213 and is supplied with the hydraulic pressure from the hydraulic pressure supply apparatus 100, and the third hydraulic passage 213 is branched into two flow passages connected to the front left wheel FL and the rear right wheel RR.

The first and second hydraulic circuits 201 and 202 may include a plurality of inlet valves 221 (221a, 221b, 221c, and 221d) to control the flow of hydraulic pressure. For example, the first hydraulic circuit 201 may be provided with the two inlet valves 221a and 221b that are connected to the second hydraulic passage 212 to control the hydraulic pressure transmitted to the two wheel cylinders 40, respectively. Further, the second hydraulic circuit 202 may be provided with the two inlet valves 221c and 221d that are connected to the third hydraulic passage 213 to control the hydraulic pressure transmitted to the two wheel cylinders 40, respectively.

The inlet valves 221 may be provided as normally open type solenoid valves that are disposed on an upstream side of the wheel cylinders 40 and are opened in a normal state and operate to be closed when receiving a close signal from the electronic control unit.

The first and second hydraulic circuits 201 and 202 may include check valves 223a, 223b, 223c and 223d provided on bypass passages that connect the front and the rear of each of the inlet valves 221 a, 221 b, 221c and 221d. The check valves 223a, 223b, 223c and 223d may be provided to allow only the flow of oil in the direction to the hydraulic pressure providing unit 110 from the wheel cylinders 40 and to limit the flow of oil in the direction to the wheel cylinders 40 from the hydraulic pressure providing unit 110. The check valves 223a, 223b, 223c and 223d may quickly release the braking pressure of the wheel cylinders 40, and may allow the hydraulic pressure in the wheel cylinders 40 to flow into the hydraulic pressure providing unit 110 when the inlet valves 221a, 221 b, 221c and 221d are not operated normally.

The first arid second hydraulic circuits 201 and 202 may further include a plurality of outlet valves 222 (222a, 222b, 222c and 222d) connected to the reservoir 30 in order to improve the performance when releasing the brake. The outlet valves 222 are connected to the wheel cylinders 40, respectively, to control the hydraulic pressure that escapes from each of the wheels RR, RL, FR and FL. That is, the outlet valves 222 may sense the braking pressure of each of the wheels RR, RL, FR and FL and may be selectively opened to control the pressure when the pressure reduction braking is required.

The outlet valves 222 may be provided as normally closed type solenoid valves that are closed in a normal state and operate to be opened when receiving an open signal from the electronic control unit.

The hydraulic control unit 200 may be connected to the first and second backup passages 251 and 252. For example, the first hydraulic circuit 201 may be connected to the first backup passage 251 to be supplied with the hydraulic pressure from the master cylinder 20, and the second hydraulic circuit 202 may be connected to the second backup passage 252 to be supplied with the hydraulic pressure from the master cylinder 20.

At this time, the first backup passage 251 may join with the first hydraulic circuit 201 upstream of the first and second inlet valves 221a and 221b. Likewise, the second backup passage 252 may join with the second hydraulic circuit 202 upstream of the third and fourth inlet valves 221c and 221d. Accordingly, the hydraulic pressure provided from the hydraulic pressure supply apparatus 100 may be supplied to the wheel cylinders 40 through the first and second hydraulic circuits 201 and 202 when the first and second cut valves 261 and 262 are closed, and the hydraulic pressure provided from the master cylinder 20 may be supplied to the wheel cylinders 40 through the first and second backup passages 251 and 252 when the first and second cut valves 261 and 262 are opened. At this time, since the plurality of inlet valves 221a, 221b, 221c and 221d is in an open state, there is no need to switch the operation state.

Reference numeral "PS1", which is not described, is a hydraulic passage pressure sensor that senses the hydraulic pressure in the first and second hydraulic circuits 201 and 202, and Reference numeral "PS2" is a backup passage pressure sensor that measures the oil pressure of the master cylinder 20. In addition, Reference numeral "MPS" is a motor control sensor that controls the rotation angle or current of the motor 120.

Hereinafter, the operation of the electronic brake system 1 according to an embodiment of the present disclosure will be described in detail.

According to the present embodiment, the hydraulic pressure supply apparatus 100 may be used by separating a low pressure mode and a high pressure mode. The low pressure mode and the high pressure mode may be changed by changing the operation of the hydraulic control unit 200. The hydraulic pressure supply apparatus 100 may generate a high hydraulic pressure without increasing the output of the motor 120 by using the high pressure mode. Accordingly, it is possible to secure stable braking power while lowering the price and weight of the brake system.

More specifically, the hydraulic piston 114 advances to generate the hydraulic pressure in the first pressure chamber 112. The more the hydraulic piston 114 advances in an initial state, that is, the more the stroke of the hydraulic piston 114 increases, the more the braking pressure rises as the amount of oil transferred from the first pressure chamber 112 to the wheel cylinders 40 increases. However, since an effective stroke of the hydraulic piston 114 exists, a maximum pressure due to the advancement of the hydraulic piston 114 exists.

At this time, the maximum pressure in the low pressure mode is less than the maximum pressure in the high pressure mode. However, the high pressure mode has a small rate of pressure increase per stroke of the hydraulic piston 114 as compared with the low pressure mode. This is because not all of the oil pushed out of the first pressure chamber 112 flows into the wheel cylinders 40 but a part of the oil flows into the second pressure chamber 113. This will be described in detail with reference to FIG. 4.

Accordingly, the low pressure mode with a large rate of pressure increase per stroke may be used in an early phase of braking where braking responsiveness is important, and the high pressure mode with high pressure may be used in a later phase of braking where the maximum braking force is important.

FIG. 3 is a hydraulic circuit diagram showing a situation in which a braking pressure is provided in the low pressure mode while the hydraulic piston 114 moves forward, and FIG. 4 is a hydraulic circuit diagram showing a situation in which a braking pressure is provided in the high pressure mode while the hydraulic piston 114 moves forward.

When the braking by a driver is started, a demanded braking amount of the driver may be sensed through information such as the pressure of the brake pedal 10 sensed by the pedal displacement sensor 11. The electronic control unit (not shown) receives the electric signal output from the pedal displacement sensor 11 and drives the motor 120.

Further, the electronic control unit may receive the magnitude of a regenerative braking amount through the backup passage pressure sensor PS2 provided at an outlet side of the master cylinder 20 and the hydraulic passage pressure sensor PS1 provided in the second hydraulic circuit 202, and may calculate the magnitude of a friction braking amount in accordance with the difference between the demanded braking amount of the driver and the regenerative braking amount to thereby grasp the magnitude of a pressure increase or a pressure decrease of the wheel cylinders 40.

Referring to FIG. 3, when the driver depresses the brake pedal 10 at a beginning of braking, the motor 120 is operated to rotate in one direction and the rotational force of the motor 120 is transmitted to the hydraulic pressure providing unit 110 by the power converting unit 130, and the hydraulic piston 114 of the hydraulic pressure providing unit 110 advances to generate the hydraulic pressure in the first pressure chamber 112. The hydraulic pressure discharged from the hydraulic pressure providing unit 110 is transmitted to the wheel cylinders 40 provided on the four wheels through the first hydraulic circuit 201 and the second hydraulic circuit 202 to generate the braking force.

Specifically, the hydraulic pressure provided in the first pressure chamber 112 is directly transmitted to the wheel cylinders 40 provided on the two wheels FR and RL through the first hydraulic passage 211 and the second hydraulic passage 212 connected to the first communication hole 111a. At this time, the first and second inlet valves 221a and 221b, which are respectively installed on two flow passages branched from the second hydraulic passage 212, are provided in the open state. In addition, the first and second outlet valves 222a and 222b, which are respectively installed on two flow passages branched from the two flow passages branched from the second hydraulic passage 212, are maintained in the closed state to prevent the hydraulic pressure from leaking to the reservoir 30.

Further, the hydraulic pressure provided in the first pressure chamber 112 is directly transmitted to the wheel cylinders 40 provided on the two wheels RR and FL through the first hydraulic passage 211 and the third hydraulic passage 213 connected to the first communication hole 111a. At this time, the third and fourth inlet valves 221c and 221d, which are respectively installed on two flow passages branched from the third hydraulic passage 213, are provided in the open state. In addition, the third and fourth outlet valves 222c and 222d, which are respectively installed on two flow passages branched from the two flow passages branched from the third hydraulic passage 213, are maintained in the closed state to prevent the hydraulic pressure from leaking to the reservoir 30.

Further, the fifth control valve 235 and the sixth control valve 236 may be switched to the open state to open the seventh hydraulic passage 217 and the eighth hydraulic passage 218. As the seventh hydraulic passage 217 and the eighth hydraulic passage 218 are opened, the second hydraulic passage 212 and the third hydraulic passage 213 communicate with each other. However, at least one of the fifth control valve 235 and the sixth control valve 236 may be maintained in the closed state as necessary.

Further, the third control valve 233 may be maintained in the closed state to block the fifth hydraulic passage 215. Accordingly, the hydraulic pressure generated in the first pressure chamber 112 is blocked from being transmitted to the second pressure chamber 113 through the second hydraulic passage 212 and the fifth hydraulic passage 215 connected to the seventh and eighth hydraulic passages 217 and 218 that are opened, thereby increasing the rate of pressure increase per stroke. Therefore, a quick braking response may be expected at the beginning of braking.

At this time, the fourth dump valve 244 may be switched to the closed state. By closing the fourth dump valve 244, the oil in the first pressure chamber 112 may be rapidly discharged only to the first hydraulic passage 211.

Further, if the pressure transmitted to the wheel cylinders 40 is measured to be higher than a target pressure value in accordance with a pedal effort of the brake pedal 10, the electronic control unit may open one or more of the first to fourth outlet valves 222 to control so as to follow the target pressure value.

Further, when the hydraulic pressure is generated in the hydraulic pressure supply apparatus 100, the first and second cut valves 261 and 262 provided on the first and second backup passages 251 and 252 connected to the first and second hydraulic pressure ports 24a and 24b of the master cylinder 20 are closed so that the hydraulic pressure discharged from the master cylinder 20 is not transmitted to the wheel cylinders 40.

Further, the pressure generated by the pressing of the master cylinder 20 according to the pedal effort of the brake pedal 10 is transmitted to the simulation apparatus 50 connected to the master cylinder 20. At this time, the normally closed type simulator valve 54 disposed at the rear end of the simulation chamber 51 is opened so that the oil filled in the simulation chamber 51 is delivered to the reservoir 30 through the simulator valve 54. In addition, the reaction force piston 52 moves so that a pressure corresponding to the load of the reaction force spring 53 supporting the reaction force piston 52 is formed in the simulation chamber 51, thereby providing a proper pedal feeling to the driver.

Further, the hydraulic passage pressure sensor PS1 that is installed on the second hydraulic passage 212 may detect the flow rate delivered to the wheel cylinder 40 installed on the front left wheel FL or the rear right wheel RR (hereinafter, simply referred to as the wheel cylinder 40). Accordingly, the flow rate delivered to the wheel cylinder 40 may be controlled by controlling the hydraulic pressure supply apparatus 100 in accordance with the output of the hydraulic passage pressure sensor PS1. Specifically, the flow rate discharged from the wheel cylinder 40 and the discharge speed may be controlled by regulating the advancing distance and the advancing speed of the hydraulic piston 114.

On the other hand, it is possible to switch from the low pressure mode shown in FIG. 3 to the high pressure mode shown in FIG. 4 before the hydraulic piston 114 advances to the maximum.

Referring to FIG. 4, in the high pressure mode, the third control valve 233 may be switched to the open state to open the fifth hydraulic passage 215. Accordingly, the hydraulic pressure generated in the first pressure chamber 112 is transmitted to the second pressure chamber 113 through the fifth hydraulic passage 215 connected to the first hydraulic passage 211 to be used to push out the hydraulic piston 114.

In the high pressure mode, since a part of the oil pushed out of the first pressure chamber 112 flows into the second pressure chamber 113, the rate of pressure increase per stroke decreases. However, since a part of the hydraulic pressure generated in the first pressure chamber 112 is used to push out the hydraulic piston 114, the maximum pressure is increased. At this time, the reason why the maximum pressure is increased is that the volume per stroke of the hydraulic piston 114 in the second pressure chamber 113 is smaller than the volume per stroke of the hydraulic piston 114 in the first pressure chamber 112.

At this time, the third dump valve 243 may be switched to the closed state. By closing the third dump valve 243, the oil in the first pressure chamber 112 may be rapidly introduced into the second pressure chamber 113 that is in a negative pressure state. However, in some cases, the third dump valve 243 may be kept open so that the oil in the second pressure chamber 113 may flow into the reservoir 30.

At this time, the fourth dump valve 244 may be switched to the closed state. By closing the fourth dump valve 244, the oil in the first pressure chamber 112 may be rapidly discharged only to the first hydraulic passage 211.

FIG. 5 is a hydraulic circuit diagram showing a situation in which a braking pressure is provided in the low pressure mode while the hydraulic piston 114 moves backward, and FIG. 6 is a hydraulic circuit diagram showing a situation in which a braking pressure is provided in the high pressure mode while the hydraulic piston 114 moves backward.

Referring to FIG. 5, when the driver depresses the brake pedal 10 at a beginning of braking, the motor 120 is operated to rotate in the opposite direction and the rotational force of the motor 120 is transmitted to the hydraulic pressure providing unit 110 by the power converting unit 130, and the hydraulic piston 114 of the hydraulic pressure providing unit 110 moves backward to generate the hydraulic pressure in the second pressure chamber 113. The hydraulic pressure discharged from the hydraulic pressure providing unit 110 is transmitted to the wheel cylinders 40 provided on the four wheels through the first hydraulic circuit 201 and the second hydraulic circuit 202 to generate the braking force.

Specifically, the hydraulic pressure provided in the second pressure chamber 113 passes through the fourth hydraulic passage 214 that is connected to the second communication hole 111b and the fourth control valve 234 provided as a check valve, and is directly transmitted to the wheel cylinders 40 provided on the two wheels FR and RL through an opened passage of the orifice on the seventh hydraulic passage 217 and the second hydraulic passage 212. At this time, the first and second inlet valves 221a and 221b are provided in the open state and the first and second outlet valves 222a and 222b are maintained in the closed state to prevent the hydraulic pressure from leaking to the reservoir 30.

Further, the hydraulic pressure provided in the second pressure chamber 113 is directly transmitted to the wheel cylinders 40 provided on the two wheels RR and FL through the fourth hydraulic passage 214, the fifth hydraulic passage 215 and the third hydraulic passage 213 connected to the second communication hole 111b. At this time, the third and fourth inlet valves 221c and 221d are provided in the open state and the third and fourth outlet valves 222c and 222d are maintained in the closed state to prevent the hydraulic pressure from leaking to the reservoir 30.

On the other hand, the third control valve 233 may be switched to the open state to open the fifth hydraulic passage 215, and the sixth hydraulic passage 216 is opened because the fourth control valve 234 is provided as a check valve allowing to transmit the hydraulic pressure in the direction to the wheel cylinders 40 from the second pressure chamber 113.

Further, the sixth control valve 236 may be maintained in the closed state to block the eighth hydraulic passage 218. The hydraulic pressure generated in the second pressure chamber 113 is blocked from being transmitted to the first pressure chamber 112 through the eighth hydraulic passage 218, thereby increasing the rate of pressure increase per stroke. Therefore, a quick braking response may be expected at the beginning of braking.

At this time, the third dump valve 243 may be switched to the closed state. By closing the third dump valve 243, the oil in the second pressure chamber 113 may be rapidly discharged only to the fourth hydraulic passage 214.

On the other hand, it is possible to switch from the low pressure mode shown in FIG. 5 to the high pressure mode shown in FIG. 6 before the hydraulic piston 114 reverses to the maximum.

Referring to FIG. 6, in the high pressure mode, the sixth control valve 236 may be switched to the open state to open the eighth hydraulic passage 218. Accordingly, the hydraulic pressure generated in the second pressure chamber 113 is transmitted to the first pressure chamber 112 through the fourth hydraulic passage 214 and first hydraulic passage 211 connected to the eighth hydraulic passage 218 that is opened to be used to pull the hydraulic piston 114.

In the high pressure mode, since a part of the oil pushed out of the second pressure chamber 113 flows into the first pressure chamber 112, the rate of pressure increase per stroke decreases. However, since a part of the hydraulic pressure generated in the second pressure chamber 113 is used to pull the hydraulic piston 114, the maximum pressure is increased. At this time, the reason why the maximum pressure is increased is that the volume per stroke of the hydraulic piston 114 in the first pressure chamber 112 is smaller than the volume per stroke of the hydraulic piston 114 in the second pressure chamber 113.

At this time, the third dump valve 243 may be switched to the closed state. By closing the third dump valve 243, the oil in the second pressure chamber 113 may be discharged only to the fourth hydraulic passage 214. However, in some cases, the third dump valve 243 may be kept open so that the oil in the second pressure chamber 113 may flow into the reservoir 30.

At this time, the fourth dump valve 244 may be switched to the closed state. By closing the fourth dump valve 244, the oil in the second pressure chamber 113 may be rapidly introduced into the first pressure chamber 112 that is in a negative pressure state. However, in some cases, the fourth dump valve 244 may be kept open so that the oil in the first pressure chamber 112 may flow into the reservoir 30.

Next, a case of releasing the braking force in the braking state in the normal operation of the electronic brake system 1 according to an embodiment of the present disclosure will be described.

FIG. 7 is a hydraulic circuit diagram showing a situation in which a braking pressure is released in the high pressure mode while the hydraulic piston 114 moves backward, and FIG. 8 is a hydraulic circuit diagram showing a situation in which a braking pressure is released in the low pressure mode while the hydraulic piston 114 moves backward.

Referring to FIG. 7, when the pedal effort applied to the brake pedal 10 is released, the motor 120 generates a rotational force in a direction opposite to the braking direction and transmits the rotational force to the power converting unit 130, and the worm shaft 131, the worm wheel 132 and the drive shaft 133 of the power converting unit 130 are rotated in the opposite direction to the braking direction to move the hydraulic piston 114 back to its original position, so that the pressure in the first pressure chamber 112 is released or a negative pressure is generated in the first pressure chamber 112. In addition, the hydraulic pressure providing unit 110 receives the hydraulic pressure discharged from the wheel cylinders 40 through the first and second hydraulic circuits 201 and 202 and transmits the hydraulic pressure to the first pressure chamber 112.

Specifically, the negative pressure generated in the first pressure chamber 112 releases the pressure of the wheel cylinders 40, which are provided on the two wheels FR and RL, through the first hydraulic passage 211 connected to the first communication hole 111a and the second hydraulic passage 212 connected to the eighth hydraulic passage 218. At this time, the first and second inlet valves 221a and 221b, which are respectively installed on two flow passages branched from the second hydraulic passage 212, are provided in the open state. In addition, the first and second outlet valves 222a and 222b, which are respectively installed on two flow passages branched from the two flow passages branched from the second hydraulic passage 212, are maintained in the closed state to prevent oil in the reservoir 30 from being introduced.

Further, the negative pressure generated in the first pressure chamber 112 releases the pressure of the wheel cylinders 40, which are provided on the two wheels FL and RR, through the first hydraulic passage 211 connected to the first communication hole 111a, the eighth hydraulic passage 218 connected to the third hydraulic passage 213, and the second hydraulic passage 212. At this time, the third and fourth inlet valves 221c and 221d, which are respectively installed on two flow passages branched from the third hydraulic passage 213, are provided in the open state. In addition, the third and fourth outlet valves 222c and 222d, which are respectively installed on two flow passages branched from the two flow passages branched from the third hydraulic passage 213, are maintained in the closed state to prevent oil in the reservoir 30 from being introduced.

Further, the third control valve 233 is switched to the open state to open the fifth hydraulic passage 215, and since the fourth control valve 234 is provided as a check valve, the first pressure chamber 112 and the second pressure chamber 113 communicate with each other through the sixth control valve 236 that is opened on the eighth hydraulic passage 218.

In order for a negative pressure to be formed in the first pressure chamber 112, the hydraulic piston 114 must move backward, but if oil is fully filled in the second pressure chamber 113, a resistance is generated when the hydraulic piston 114 is reversed. At this time, when the third control valve 233, the fifth control valve 235 and the sixth control valve 236 are opened so that the fourth hydraulic passage 214 and the fifth hydraulic passage 215 are communicated with the second hydraulic passage 212 and the first hydraulic passage 211, the oil in the second pressure chamber 113 is moved to the first pressure chamber 112.

At this time, the third dump valve 243 may be switched to the closed state. By closing the third dump valve 243, the oil in the second pressure chamber 113 may be discharged only to the fourth hydraulic passage 214. However, in some cases, the third dump valve 243 may be maintained in the open state so that the oil in the second pressure chamber 113 may flow into the reservoir 30.

Further, in a case where the negative pressure transmitted to the first and second hydraulic circuits 201 and 202 is measured to be higher than a target pressure release value corresponding to the release amount of the brake pedal 10, the electronic control unit may open one or more of the first to fourth outlet valves 222 to control so as to follow the target pressure value.

Further, when a hydraulic pressure is generated in the hydraulic pressure supply apparatus 100, the first arid second cut valves 261 and 262 provided on the first and second backup passages 251 and 252 connected to the first and second hydraulic pressure ports 24a and 24b of the master cylinder 20 are closed so that the negative pressure generated in the master cylinder 20 is not transmitted to the hydraulic control unit 200.

In the high pressure mode shown in FIG. 7, since the oil in the second pressure chamber 113 is moved to the first pressure chamber 112 together with the oil in the wheel cylinders 40 by the negative pressure in the first pressure chamber 112 generated as the hydraulic piston 114 moves backward, the pressure reduction rate of the wheel cylinders 40 is small. Therefore, it may be difficult to release the pressure quickly in the high pressure mode.

For this reason, the high pressure mode may only be used in high pressure situations and may be switched to the low pressure mode shown in FIG. 8 if the pressure falls below a certain level.

Referring to FIG. 8, instead of keeping the third control valve 233 closed or switching the third control valve 233 to the closed state so as to close the fifth hydraulic fluid passage 215, the third dump valve 243 may be switched to the open state or kept open to connect the second pressure chamber 113 to the reservoir 30.

In the low pressure mode, since the negative pressure generated in the first pressure chamber 112 is used only to suck the oil stored in the wheel cylinder 40, the pressure reduction rate per stroke of the hydraulic piston 114 is increased as compared with the high pressure mode. The hydraulic pressure generated in the second pressure chamber 113 is mostly discharged to the reservoir 30 that is in atmospheric pressure state rather than passing through the fourth control valve 234 provided as a check valve.

At this time, the fourth dump valve 244 may be switched to the closed state. By closing the fourth dump valve 244, the negative pressure generated in the first pressure chamber 112 may quickly suck the oil stored in the wheel cylinders 40.

Unlike in FIG. 8, the braking force of the wheel cylinders 40 may be released even when the hydraulic piston 114 moves in the opposite direction, that is, advances.

FIG. 9 is a hydraulic circuit diagram showing a situation in which a braking pressure is released while the hydraulic piston 14 moves forward.

Referring to FIG. 9, when the pedal effort applied to the brake pedal 10 is released, the motor 120 generates a rotational force in a direction opposite to the braking direction and transmits the rotational force to the power converting unit 130, and the worm shaft 131, the worm wheel 132 and the drive shaft 133 of the power converting unit 130 are rotated in the opposite direction to the braking direction to move the hydraulic piston 114 back to its original position, so that the pressure in the second pressure chamber 113 is released or a negative pressure is generated in the second pressure chamber 113. In addition, the hydraulic pressure providing unit 110 receives the hydraulic pressure discharged from the wheel cylinders 40 through the first and second hydraulic circuits 201 and 202 and transmits the hydraulic pressure to the second pressure chamber 113.

Specifically, the negative pressure generated in the second pressure chamber 113 releases the pressure of the wheel cylinders 40, which are provided on the two wheels FR and RL, through the fourth hydraulic passage 214, the fifth hydraulic passage 215 and the seventh hydraulic passage 217 that are connected to the second communication hole 111b. At this time, the first and second inlet valves 221a and 221b, which are respectively installed on two flow passages branched from the second hydraulic passage 212, are provided in the open state. In addition, the first and second outlet valves 222a and 222b, which are respectively installed on two flow passages branched from the two flow passages branched from the second hydraulic passage 212, are maintained in the closed state to prevent oil in the reservoir 30 from being introduced.

Further, the negative pressure generated in the second pressure chamber 113 releases the pressure of the wheel cylinders 40 which are provided on the two wheels FL and RR, through the fourth hydraulic passage 214, the fifth hydraulic passage 215 and the seventh hydraulic passage 217 that are connected to the second communication hole 111b. At this time, the third and fourth inlet valves 221c and 221d, which are respectively installed on two flow passages branched from the third hydraulic passage 213, are provided in the open state. In addition, the third and fourth outlet valves 222c and 222d, which are respectively installed on two flow passages branched from the two flow passages branched from the third hydraulic passage 213, are maintained in the closed state to prevent oil in the reservoir 30 from being introduced.

At this time, the third control valve 233 is switched to the open state to open the fifth hydraulic passage 215, and the hydraulic pressure generated in the first pressure chamber 112 is mostly discharged to the reservoir 30 that is in atmospheric pressure state rather than passing through the first and second control valves 231 and 232 provided as check valves and the opened sixth control valve 236.

At this time, the third dump valve 243 may be switched to the closed state. By closing the third dump valve 243, the negative pressure generated in the second pressure chamber 113 may quickly suck the oil stored in the wheel cylinders 40.

Further, in a case where the negative pressure transmitted to the first and second hydraulic circuits 201 and 202 is measured to be higher than a target pressure release value corresponding to the release amount of the brake pedal 10, the electronic control unit may open one or more of the first to fourth outlet valves 222 to control so as to follow the target pressure value.

Further, when a hydraulic pressure is generated in the hydraulic pressure supply apparatus 100, the first and second cut valves 261 and 262 provided on the first and second backup passages 251 and 252 connected to the first and second hydraulic pressure ports 24a and 24b of the master cylinder 20 are closed so that the negative pressure generated in the master cylinder 20 is not transmitted to the hydraulic control unit 200.

Further, the hydraulic passage pressure sensor PS1 that is installed on the second hydraulic passage 212 may detect the flow rate discharged from the wheel cylinder 40 installed on the front left wheel FL or the rear right wheel RR. Accordingly, the flow rate discharged from the wheel cylinder 40 may be controlled by controlling the hydraulic pressure supply apparatus 100 in accordance with the output of the hydraulic passage pressure sensor PS1. Specifically, the flow rate discharged from the wheel cylinder 40 and the discharge speed may be controlled by regulating the advancing distance and the advancing speed of the hydraulic piston 114.

FIG. 10 is a hydraulic circuit diagram showing a situation in which the electronic brake system 1 according to an embodiment of the present disclosure is operated in an ABS mode and a braking is selectively performed while the hydraulic piston 114 moves forward, and FIG. 11 is a hydraulic circuit diagram showing a situation in which the electronic brake system 1 according to an embodiment of the present disclosure is operated in an ABS mode and a braking is selectively performed while the hydraulic piston 114 moves backward.

When the motor 120 operates according to a pedal effort of the brake pedal 10, a hydraulic pressure is generated as the rotational force of the motor 120 is transmitted to the hydraulic pressure providing unit 110 through the power converting unit 130. At this time, the first and second cut valves 261 and 262 are closed so that the hydraulic pressure discharged from the master cylinder 20 is not transmitted to the wheel cylinders 40.

Referring to FIG. 10, a hydraulic pressure is generated in the first pressure chamber 112 as the hydraulic piston 114 moves forward and the fourth inlet valve 221d is provided in the open state so that the hydraulic pressure transmitted through the first hydraulic passage 211 and the third hydraulic passage 213 operates the wheel cylinder 40 disposed at the front left wheel FL, thereby generating a braking force.

At this time, the first to third inlet valves 221a to 221c are switched to the closed state and the first to fourth outlet valves 222a to 222c are kept closed. In addition, the third dump valve 243 is provided in the open state to fill the oil from the reservoir 30 to the second pressure chamber 113, and the fourth dump valve 244 is provided in the closed state to prevent oil from being discharged from the first pressure chamber 112 to the reservoir 30. Accordingly, the hydraulic pressure generated in the first pressure chamber 112 may be transmitted quickly to the wheel cylinders 40.

Referring to FIG. 11, a hydraulic pressure is generated in the second pressure chamber 113 as the hydraulic piston 114 moves backward and the first inlet valve 221a is provided in the open state so that the hydraulic pressure transmitted through the fourth hydraulic passage 214, an orifice passage on the seventh hydraulic passage 217, and the second hydraulic passage 212 operates the wheel cylinder 40 disposed at the front right wheel FR, thereby generating a braking force.

At this time, the second to fourth inlet valves 221b to 221d are switched to the closed state and the first to fourth outlet valves 222a to 222c are kept closed.

That is, the electronic brake system 1 according to an embodiment of the present disclosure can independently control the operation of the motor 120 and the respective valves 54, 60, 221a, 221b, 221c, 221d, 222a, 222b, 222c, 222d, 233, 235, 236, 243 and 244 so that the hydraulic pressure may be selectively transmitted to or discharged from the wheel cylinders 40 of the wheels RL, RR, FL and FR according to the required pressure, and thus precise pressure control becomes possible.

Next, a case where the electronic brake system 1 as above does not operate normally will be described. FIG. 12 is a hydraulic circuit diagram showing a state in which the electronic brake system 1 according to an embodiment of the present disclosure is operated abnormally.

Referring to FIG. 12, in a case where the electronic brake system 1 is operated abnormally, the respective valves 54, 60, 221a, 221b, 221c, 221d, 222a, 222b, 222c, 222d, 233, 235, 236, 243 and 244 are provided in an initial state of braking which is in a non-operating state.

When a driver presses the brake pedal 10, the input rod 12 connected to the brake pedal 10 advances, at the same time the first piston 21a in contact with the input rod 12 advances, and the second piston 22a also advances by the pressing or movement of the first piston 21a. At this time, since there is no gap between the input rod 12 and the first piston 21 a, rapid braking may be performed.

Further, the hydraulic pressure discharged from the master cylinder 20 is transmitted to the wheel cylinders 40 through the first and second backup passages 251 and 252 connected for a backup brake, thereby exerting a braking force.

At this time, the first and second cut valves 261 and 262 provided on the first and second backup passages 251 and 252 and the inlet valves 221 for opening and closing the flow passages of the first and second hydraulic circuits 201 and 202 are provided as normally open type solenoid valves, and the simulator valve 54 arid the outlet valves 222 are provided as normally closed type solenoid valves, and thus the hydraulic pressure is immediately transmitted to the four wheel cylinders 40. Therefore, since stable braking may be performed, the braking stability is improved.

FIG. 13 is a hydraulic circuit diagram showing a state in which the electronic brake system 1 according to an embodiment of the present disclosure is operated in a dump mode.

The electronic brake system 1 according to an embodiment of the present disclosure may discharge only the braking pressure provided to the corresponding wheel cylinders 40 through the first to fourth outlet valves 222a to 222d.

Referring to FIG. 13, in a case where the first to fourth inlet valves 221a to 221d are switched to the closed state. the first to third outlet valves 222a to 222c are maintained in the closed state, and the fourth outlet valve 222d is switched to the open state, the hydraulic pressure discharged from the wheel cylinder 40 provided on the front left wheel FL is discharged to the reservoir 30 through the fourth outlet valve 222d.

The reason why the hydraulic pressure in the wheel cylinders 40 is discharged through the outlet valves 222 is because the pressure in the reservoir 30 is smaller than the pressure in the wheel cylinders 40. The pressure in the reservoir 30 is usually provided at atmospheric pressure. Since the pressure in the wheel cylinders 40 is usually significantly higher than the atmospheric pressure, the hydraulic pressure in the wheel cylinders 40 is quickly discharged to the reservoir 30 when the outlet valves 222 are opened.

On the other hand, though not shown in the drawing, the fourth outlet valve 222d is opened to discharge the hydraulic pressure in the corresponding wheel cylinder 40, and at the same time the first to third inlet valves 221a to 221c are maintained in the open state so that the hydraulic pressure may be supplied to the remaining three wheels FR, RL and RR.

The flow rate discharged from the wheel cylinders 40 increases as the difference between the pressure in the wheel cylinders 40 and the pressure in the first pressure chamber 112 increases. For example, the greater the volume of the first pressure chamber 112 as the hydraulic piston 114 moves backward, the larger the flow rate may be discharged from the wheel cylinders 40.

As such, by independently controlling the respective valves 221a, 221b, 221c, 221d, 222a, 222b, 222c, 222d, 233, 235, 236, 243 and 244, the hydraulic pressure may be selectively transmitted to or discharged from the wheel cylinders 40 of the wheels RL, RR, FL and FR according to the required pressure, and thus precise pressure control becomes possible.

FIG. 14 is a hydraulic circuit diagram showing a state in which the electronic brake system 1 according to an embodiment of the present disclosure is operated in a balance mode.

The balance mode may be started when the pressures of the first pressure chamber 112 and the second pressure chamber 113 are not balanced. For example, the electronic control unit may detect an unbalanced state of the pressures by sensing the hydraulic pressure in the first hydraulic circuit 201 and the hydraulic pressure in the second hydraulic circuit 202 from the hydraulic passage pressure sensor PS1.

In the balance mode, a balancing process may be performed so that the first and second pressure chambers 112 and 113 of the hydraulic pressure providing unit 110 are communicated with each other to balance the pressure. Generally, the pressures of the first pressure chamber 112 and the second pressure chamber 113 are in equilibrium. For example, in a braking situation in which the hydraulic piston 114 moves forward to apply the braking force, only the hydraulic pressure in the first pressure chamber 112 of the two pressure chambers is transmitted to the wheel cylinders 40. In this case, however, since the oil in the reservoir 30 is transferred to the second pressure chamber 113 through the second dump passage 117, the equilibrium of the two pressure chambers is not broken. On the contrary, in a braking situation in which the hydraulic piston 114 moves backward to apply the braking force, only the hydraulic pressure in the second pressure chamber 112 of the two pressure chambers is transmitted to the wheel cylinders 40. In this case, however, since the oil in the reservoir 30 is transferred to the first pressure chamber 112 through the first dump passage 116, the equilibrium of the two pressure chambers is not broken.

However, if a leak occurs due to the repeated operation of the hydraulic pressure supply apparatus 100 or if the ABS is operated suddenly, the pressure balance between the first pressure chamber 112 arid the second pressure chamber 113 may be broken. That is, the hydraulic piston 114 may not be in the calculated position and malfunction may occur.

Hereinafter, the case where the pressure in the first pressure chamber 112 is greater than the pressure in the second pressure chamber 113 will be described as an example. When the motor 120 operates, the hydraulic piston 114 moves forward, and in this process, the pressure in the first pressure chamber 112 and the pressure in the second pressure chamber 113 are balanced. If the pressure in the second pressure chamber 113 is greater than the pressure in the first pressure chamber 112, the hydraulic pressure in the second pressure chamber 113 is transferred to the first pressure chamber 112 so that the pressure balance adjusted.

Referring to FIG. 14, in the balanced mode, the third control valve 233 and the sixth control valve 236 may be switched to the open state to open the fifth hydraulic passage 215 and the eighth hydraulic passage 218. That is, the second hydraulic passage 212, the eighth hydraulic passage 218, the seventh hydraulic passage 217 and the fifth hydraulic passage 215 are connected to each other to communicate the first pressure chamber 112 and the second pressure chamber 113. Accordingly, the pressures in the first pressure chamber 112 and the second pressure chamber 113 are balanced. At this time, the first to fourth inlet valves 221 are switched to the closed state, and the motor 120 may be operated to move the hydraulic piston 114 forward or backward so that the balancing process proceeds quickly. In addition, the fourth dump valve 244 may be switched to the closed state so that the oil in the first pressure chamber 112 is discharged only to the first hydraulic passage 211.

FIG. 15 is a hydraulic circuit diagram showing a state in which the electronic brake system 1 according to an embodiment of the present disclosure is operated in an inspection mode.

In a case where the electronic brake system 1 operates abnormally, the respective valves 54, 60, 221*a*, 221*b*, 221*c*, 221*d*, 222*a*, 222*b*, 222*c*, 222*d*, 233, 235, 236, 243 and 244 are provided in an initial state of braking which is in a non-operating state, and the first and second cut valves 261 and 262 provided on the first and second backup passages 251 and 252 and the inlet valves 221 provided on an upstream side of the wheel cylinders 40 provided on the respective wheels RR, RL, FR and FL are opened, so that the hydraulic pressure is immediately transmitted to the wheel cylinders 40.

At this time, the simulator valve 54 is provided in the closed state so that the hydraulic pressure transmitted to the wheel cylinders 40 through the first backup passage 251 is prevented from leaking to the reservoir 30 through the simulation apparatus 50. Therefore, when a driver depresses the brake pedal 10, the hydraulic pressure discharged from the master cylinder 20 is transmitted to the wheel cylinders 40 without loss, thereby ensuring stable braking.

However, when a leak occurs in the simulator valve 54, a part of the hydraulic pressure discharged from the master cylinder 20 may be lost to the reservoir 30 through the simulator valve 54. The simulator valve 54 is provided to be closed in an abnormal mode, but in this case, the hydraulic pressure discharged from the master cylinder 20 pushes the reaction force piston 52 of the simulation apparatus 50, so that leakage may occur in the simulator valve 54 by the pressure formed at the rear end of the simulation chamber 51.

In this way, in a case where leakage occurs in the simulator valve 54, the driver does not obtain the intended braking force, thereby causing a problem in braking stability.

The inspection mode is a mode for generating a hydraulic pressure in the hydraulic pressure supply apparatus 100 to inspect whether there is a loss of pressure in order to inspect whether leakage occurs in the simulator valve 54. If the hydraulic pressure discharged from the hydraulic pressure supply apparatus 100 flows into the reservoir 30 and a pressure loss occurs, it is difficult to know whether or not leakage has occurred in the simulator valve 54.

Therefore, in the inspection mode, as shown in FIG. 15, the hydraulic circuit connected to the hydraulic pressure supply apparatus 100 may be constituted as a closed circuit by closing the inspection valve 60. That is, by closing the inspection valve 60, the simulator valve 54 and the outlet valves 222, the flow passages connecting the hydraulic pressure supply apparatus 100 and the reservoir 30 may be blocked to constitute a closed circuit.

The electronic brake system 1 according to an embodiment of the present disclosure may provide hydraulic pressure only to the first backup passage 251 to which the simulation apparatus 50 is connected among the first and second backup passages 251 arid 252 in the inspection mode. Accordingly, in order to prevent the hydraulic pressure discharged from the hydraulic pressure supply apparatus 100 from being transmitted to the master cylinder 20 along the second backup passage 252, the second cut valve 262 may be switched to the closed state in the inspection mode. In addition, by maintaining the third control valve 233 which connects the first hydraulic circuit 201 and the second hydraulic circuit 202 in the closed state, closing the fifth control valve 235 which communicates with the fifth hydraulic passage 215 and the seventh hydraulic passage 217, and closing the sixth control valve 236 which communicates the fifth hydraulic passage 215 and the second hydraulic passage 212, the hydraulic pressure in the second pressure chamber 113 may be prevented from leaking to the first pressure chamber 112.

Further, in the inspection mode, in the initial state of the valves 54, 60, 221*a*, 221*b*, 221*c*, 221*d*, 222*a*, 222*b*, 222*c*, 222*d*, 233, 235, 236, 243 and 244 included in the electronic brake system 1 of the present disclosure, the first to fourth inlet valves 221*a* to 221*d*, the third control valve 233, the fourth dump valve 244, and the second cut valve 262 are switched to the closed state, and the first cut valve 261 is maintained in the open state, so that the hydraulic pressure generated in the hydraulic pressure supply apparatus 100 may be transmitted to the master cylinder 20.

The hydraulic pressure in the hydraulic pressure supply apparatus 100 may be prevented from being transmitted to the first and second hydraulic circuits 201 and 202 by closing the inlet valves 221, the hydraulic pressure in the hydraulic pressure supply apparatus 100 may be prevented from circulating along the first backup passage 251 and the second backup passage 252 by switching the second cut valve 262 to the closed state, and the hydraulic pressure supplied to the master cylinder 20 may be prevented from leaking to the reservoir 30 by switching the inspection valve 60 to the closed state.

In the inspection mode, after generating the hydraulic pressure in the hydraulic pressure supply apparatus 100, the electronic control unit may analyze a signal transmitted from the backup passage pressure sensor PS2 that measures the oil pressure in the master cylinder 20 and sense a state in which leakage occurs in the simulator valve 54. For example, as a result of the measurement of the backup passage pressure sensor PS2, it may be determined that the simulator valve 54 is not leaking when there is no loss, and it may be determined that there is a leak in the simulator valve 54 when a loss occurs.

FIG. 16 is a hydraulic circuit diagram showing a situation in which a braking pressure is provided when the hydraulic pressure supply apparatus 100 of an electronic brake system 2 according to another embodiment of the present disclosure is in an abnormal state.

The electronic brake system 2 according to the present embodiment will be described mainly on the points different from the electronic brake system 1 of the embodiment described above, and the same reference numerals denote the same components, and thus detailed description thereof will be omitted.

According to an aspect of the present disclosure, when the electronic brake system 2 operates normally, the hydraulic pressure supply apparatus 100 transmits a hydraulic pressure to the wheel cylinders 40 in accordance with a pedal effort of the brake pedal 10. However, when the hydraulic pressure supply apparatus 100 does not operate normally, the hydraulic pressure generated from the master cylinder 20 is transmitted to the wheel cylinders 40 for stable braking. This is called a fallback mode.

The electronic brake system 2 according to the present embodiment is configured to perform a braking operation in cooperation with electronic parking brakes EPB in the fallback mode operation.

Referring to FIG. 16, when a driver presses the brake pedal 10, the input rod 12 connected to the brake pedal 10 advances, at the same time the first piston 21a in contact with the input rod 12 advances, and the second piston 22a also advances by the pressing or movement of the first piston 21a. At this time, since there is no gap between the input rod 12 and the first piston 21a, rapid braking may be performed.

Further, the hydraulic pressure discharged from the master cylinder 20 is transmitted to the wheel cylinders 40 through the first and second backup passages 251 and 252 connected for a backup brake, thereby exerting a braking force.

At this time, the first and second cut valves 261 and 262 provided on the first and second backup passages 251 and 252 and the inlet valves 221 that opens and closes the flow passages of the first and second hydraulic circuits 201 and 202 are provided as normally open type solenoid valves, and the simulator valve 54 and the outlet valves 222 are provided as normally closed type solenoid valves, and thus the hydraulic pressure may be immediately transmitted to the four wheel cylinders 40, but the hydraulic pressure is controlled to flow only to the front wheels FR and FL among the wheels RR, RL, FR and FL connected to the respective hydraulic circuits 201 and 202 in order to exhibit a stable braking and maximum deceleration effect of a vehicle.

That is, the first and fourth inlet valves 221a and 221d connected to the front wheels FR and FL are maintained in the open state so that the hydraulic pressure flows only to the front right wheel FR connected to the first hydraulic circuit 201 and the front left wheel FL connected to the second hydraulic circuit 202, and the second and third inlet valves 221b and 221c connected to the rear wheels RL and RR are switched to the closed state.

Further, as the outlet valves 222 connecting the first and second hydraulic circuits 201 and 202 to the reservoir 30, the third control valve 233, the fifth control valve 235, and the sixth control valve 236 are configured as normally closed type solenoid valves, the hydraulic pressure discharged from the master cylinder 20 is not leaked to the reservoir 30 or the hydraulic pressure providing unit 110.

Accordingly, the hydraulic pressures generated from the master chambers 20a and 20b are entirely transmitted to the front right wheel FR of the first hydraulic circuit 201 and the front left wheel FL of the second hydraulic circuit 202, respectively.

On the other hand, the electronic control unit activates the electronic parking brakes EPB provided on the rear wheels RL and RR as the hydraulic pressure supply apparatus 100 is determined to be abnormal. That is, in the fallback mode, the front wheels FR and FL are braked only by the hydraulic pressure generated from the master cylinder 20 and the rear wheels RL and RR are braked through the electronic parking brakes EPB, so that the electronic brake system according to the present embodiment may perform a stable braking operation through coordinated control with the electronic parking brakes EPB.

In the fallback mode, the hydraulic pressure discharged from the master cylinder 20 may be immediately transmitted to the four wheel cylinders 40 when the electronic brake system 2 is shut down as a whole or fails as an operation in a state in which the hydraulic pressure supply apparatus 100 is operated abnormally. Therefore, a stable braking may be performed to thereby improve the braking stability.

Although in the above-described fallback mode control, an X-split type in which the first hydraulic circuit 201 and the second hydraulic circuit 202 control two front wheels and two rear wheels, respectively has been described, it is not limited thereto. That is, the first hydraulic circuit 201 may be connected to control the two front wheels FR arid FL or the two rear wheels RR and RL.

For example, FIG. 17 shows a hydraulic circuit diagram of an electronic brake system 3 according to another embodiment of the present disclosure. Herein, the same reference numerals as those in the preceding drawings indicate members performing the same function.

Referring to FIG. 17, in the electronic brake system 3 according to the present embodiment, the first hydraulic circuit 201 of the hydraulic control unit 200 is connected to control the rear wheels RR and RL and the second hydraulic circuit 202 is connected to control the front wheels FR and FL. the electronic brake system 3 may further include a circuit passage 253 connecting the first hydraulic circuit 201 that is connected to the first backup passage 251 and the second hydraulic circuit 202 that is connected to the second backup passage 252, and a circuit valve 263 provided on the circuit passage 253.

The circuit passage 253 allows the first and second backup passages 251 arid 252 to communicate with each other by connecting the first and second hydraulic circuits 201 and 202. That is, the hydraulic pressure flowing through the first backup passage 251 is transmitted to the second hydraulic circuit 202 through the circuit passage 253, or the hydraulic pressure flowing through the second backup passage 252 is transmitted to the first hydraulic circuit 201 through the circuit passage 253.

The circuit valve 263 is provided on the circuit passage 253 to control the flow of oil. The circuit valve 263 may be provided as a normally open type solenoid valve that is opened in a normal state and operates to be close when receiving a close signal from the electronic control unit.

The fallback mode operation through the electronic brake system 3, that is, the case where the hydraulic pressure supply apparatus 100 is operated abnormally will be described below with reference to FIG. 17.

As shown in FIG. 17, when a driver presses the brake pedal 10, the input rod 12 connected to the brake pedal 10 advances, at the same time the first piston 21a in contact with the input rod 12 advances, and the second piston 22a also advances by the pressing or movement of the first piston 21a. At this time, since there is no gap between the input rod 12 and the first piston 21a, rapid braking may be performed.

Further, the hydraulic pressure discharged from the master cylinder 20 is transmitted to the wheel cylinders 40 through the first and second backup passages 251 and 252 connected for a backup brake, thereby exerting a braking force.

At this time, the first and second cut valves 261 and 262 provided on the first and second backup passages 251 and 252 and the inlet valves 221 that opens and closes the flow passages of the first and second hydraulic circuits 201 and 202 are provided as normally open type solenoid valves, and the simulator valve 54 and the outlet valves 222 are provided as normally closed type solenoid valves, and thus the hydraulic pressure may be immediately transmitted to the four wheel cylinders 40, but the hydraulic pressure is controlled to flow only to the front wheels FR and FL among the wheels RR, RL, FR and FL connected to the respective hydraulic circuits 201 and 202 in order to exhibit a stable braking and maximum deceleration effect of a vehicle.

That is, the third and fourth inlet valves 221c and 221d are maintained in the open state so that the hydraulic pressure flows only to the front right wheel FR and the front left wheel FL connected to the second hydraulic circuit 202, and the first and second inlet valves 221a and 221b connected to the rear wheels RL and RR are switched to the closed state. At this time, the hydraulic pressure discharged from the first master chamber 20a must be transferred to the first hydraulic circuit 201 through the first backup passage 251, but as the first and second inlet valves 221a and 221b are switched to the closed state and the first and second outlet valves 222a and 222b are configured as normally closed type solenoid valves, the hydraulic pressure is not transmitted to the wheel cylinders 40 connected to the first hydraulic circuit 201. Accordingly, the hydraulic pressure discharged from the first master chamber 20a is transmitted to the second hydraulic circuit 202 through the circuit passage 253 as the circuit valve 263 is provided as a normally open type solenoid valve.

Further, as the outlet valves 222 connecting the first and second hydraulic circuits 201 and 202 to the reservoir 30, the third control valve 233, the fifth control valve 235, and the sixth control valve 236 are configured as normally closed type solenoid valves, the hydraulic pressure discharged from the master cylinder 20 is not leaked to the reservoir 30 or the hydraulic pressure providing unit 110.

Accordingly, the hydraulic pressure generated from the master cylinder 20 is entirely supplied only to the front wheels FR and FL to perform a braking operation.

On the other hand, the electronic control unit activates the electronic parking brakes EPB provided on the rear wheels RL and RR as the hydraulic pressure supply apparatus 100 is determined to be abnormal. That is, in the fallback mode, the hydraulic pressure generated from the master cylinder 20 is supplied only to the front wheels FR and FL so that a braking operation is performed and the rear wheels RR and RL are braked through the electronic parking brakes EPB, so that the electronic brake system according to the present embodiment may perform a stable braking operation through coordinated control with the electronic parking brakes EPB.

On the other hand, in the fallback mode, the hydraulic pressure discharged from the master cylinder 20 may be immediately transmitted to the four wheel cylinders 40 when the electronic brake system 2 is shut down as a whole or fails as an operation in a state in which the hydraulic pressure supply apparatus 100 is operated abnormally. Further, as the two hydraulic circuits 201 and 202 are connected through the circuit passage 253, the hydraulic pressure may be prevented from being transmitted intensively to either one of the two hydraulic circuits 201 and 202. Therefore, a stable braking may be performed to thereby improve the braking stability.

FIG. 18 is a hydraulic circuit diagram showing a state in which an electronic brake system according to another embodiment of the present disclosure is operated in an inspection mode.

A electronic brake system 4 according to the present embodiment will be described mainly on the points different from the electronic brake system 1 of the embodiment described above, and the same reference numerals denote the same components, and thus detailed description thereof will be omitted.

In the electronic brake system 4 according to the present embodiment, the reservoir 30 may include a first reservoir passage 61 and a second reservoir passage 62, the first master chamber 20a may be connected to the reservoir 30 through the first reservoir passage 61, and the second master chamber 20b may be connected to the reservoir 30 through the second reservoir passage 62.

Further, a check valve 64, which is provided to block the flow of oil flowing into the reservoir 30 from the first master chamber 20a while allowing the flow of oil flowing into the first master chamber 20a from the reservoir 30, may be provided on the first reservoir passage 61. That is, the check valve 64 may be provided to allow only one directional fluid flow.

Further, the front of the check valve 64 on first reservoir passage 61 may be connected to the front of the third dump valve 243 by an inspection passage 63. An inspection valve 65, which is provided to block the flow of oil flowing into the first master chamber 20a from the front of the third dump valve 243 and the second dump passage 117 while allowing the flow of oil flowing into the front of the third dump valve 243 and the second dump passage 117 from the first master chamber 20a, may be provided on the inspection passage 63. That is, the inspection valve 65 may be provided to allow only one directional fluid flow.

In a case where the electronic brake system 4 according to the present embodiment operates abnormally, the respective valves 54, 221a, 221b, 221c, 221d, 222a, 222b, 222c, 222d, 233, 235, 236, 243, 261 and 262 are provided in an initial state of braking which is in a non-operating state, and the first and second cut valves 261 and 262 provided on the first and second backup passages 251 and 252 are opened, so that the hydraulic pressure is immediately transmitted to the wheel cylinders 40 through the inlet valves 221 provided on the upstream side of the wheel cylinders 40 provided on the respective wheels RR, RL, FR and FL.

At this time, the simulator valve 54 is provided in the closed state so that the hydraulic pressure transmitted to the wheel cylinders 40 through the first backup passage 251 is prevented from leaking to the reservoir 30 through the simulation apparatus 50. Therefore, when a driver depresses the brake pedal 10, the hydraulic pressure discharged from the master cylinder 20 is transmitted to the wheel cylinders 40 without loss, thereby ensuring stable braking.

However, when a leak occurs in the simulator valve 54, a part of the hydraulic pressure discharged from the master cylinder 20 may be lost to the reservoir 30 through the simulator valve 54. The simulator valve 54 is provided to be closed in an abnormal mode, but in this case, the hydraulic pressure discharged from the master cylinder 20 pushes the reaction force piston 52 of the simulation apparatus 50, so that leakage may occur in the simulator valve 54 by the pressure formed at the rear end of the simulation chamber 51.

In this way, in a case where leakage occurs in the simulator valve 54, the driver does not obtain the intended braking force, thereby causing a problem in braking stability.

The inspection mode is a mode for generating a hydraulic pressure in the hydraulic pressure supply apparatus 100 to inspect whether there is a loss of pressure in order to inspect whether leakage occurs in the simulator valve 54. If the hydraulic pressure discharged from the hydraulic pressure supply apparatus 100 flows into the reservoir 30 and a pressure loss occurs, it is difficult to know whether or not leakage has occurred in the simulator valve 54.

Therefore, in the inspection mode, as shown in FIG. 18, the hydraulic circuit connected to the hydraulic pressure supply apparatus 100 may be constituted as a closed circuit by closing the third dump valve 243 connected to the inspection passage 63. That is, by closing the third dump valve 243, the simulator valve 54 and the inlet valves 221, the flow passages connecting the hydraulic pressure supply apparatus 100 and the reservoir 30 may be blocked to constitute a closed circuit.

The electronic brake system 4 according to the present embodiment may provide hydraulic pressure only to the first backup passage 251 to which the simulation apparatus 50 is connected among the first and second backup passages 251 and 252 in the inspection mode. Accordingly, in order to prevent the hydraulic pressure discharged from the hydraulic pressure supply apparatus 100 from being transmitted to the master cylinder 20 along the second backup passage 252, the second cut valve 262 may be switched to the closed state in the inspection mode. In addition, by maintaining the third control valve 233 provided on the fifth hydraulic passage 215 in the closed state, closing the fifth control valve 235 communicating the first hydraulic circuit 201 and the second hydraulic circuit 202, and closing the sixth control valve 236 provided on the eighth hydraulic passage 218, the hydraulic pressure in the second pressure chamber 113 may be prevented from leaking to the first pressure chamber 112.

Further, in the inspection mode, in the initial state of the valves 54, 221a, 221b, 221c, 221d, 222a, 222b, 222c, 222d, 233, 235, 236, 243, 261 and 262 included in the electronic brake system 4 of the present disclosure, the first to fourth inlet valves 221a to 221d, the third control valve 233, the second cut valve 262, and the third dump valve 243 are switched to the closed state, and the first cut valve 261 is maintained in the open state, so that the hydraulic pressure generated in the hydraulic pressure supply apparatus 100 may be transmitted to the master cylinder 20.

The hydraulic pressure in the hydraulic pressure supply apparatus 100 may be prevented from being transmitted to the first and second hydraulic circuits 201 and 202 by closing the inlet valves 221, the hydraulic pressure in the hydraulic pressure supply apparatus 100 may be prevented from circulating along the second backup passage 252 by switching the second cut valve 262 to the closed state, and the hydraulic pressure supplied to the master cylinder 20 may be prevented from leaking to the reservoir 30 by switching the third dump valve 243 to the closed state.

In the inspection mode, after generating the hydraulic pressure in the hydraulic pressure supply apparatus 100, the electronic control unit may analyze a signal transmitted from the backup passage pressure sensor PS2 that measures the oil pressure in the master cylinder 20 and sense a state in which leakage occurs in the simulator valve 54. For example, as a result of the measurement of the backup passage pressure sensor PS2, it may be determined that the simulator valve 54 is not leaking when there is no loss, and it may be determined that there is a leak in the simulator valve 54 when a loss occurs.

As described above, in the inspection mode according to the present embodiment, the third dump valve 243 provided in the hydraulic pressure supply apparatus 100 is connected to the inspection passage 63 provided with the check valve 64 so as to be constituted and controlled by a closed circuit so that the number of valves used in the brake system may be reduced to reduce the manufacturing cost.

FIG. 19 is a hydraulic circuit diagram showing a preparation state in which the electronic brake system 4 according to another embodiment of the present disclosure inspects whether the master cylinder 20 is stuck, and FIG. 20 is a hydraulic circuit diagram showing an inspection state in which the electronic brake system 4 inspects whether the master cylinder 20 is stuck.

In a case where the second piston 22a of the master cylinder 20 is stuck to the inner wall of the piston, the driver cannot recognize the stuck state in a normal operation. However, when an abnormality occurs in the function of another element of the brake system and the mode is switched to the fallback mode, the second piston 22a may not move or may move non-linearly, resulting in a decrease in braking performance.

As shown in FIG. 19, in a preparation state for determining whether the second piston 22a is stuck, in a state in which the respective valves 54, 221a, 221b, 221c, 221d, 222a, 222b, 222c, 222d, 233, 235, 236, 243, 261 and 262 are provided in an initial state of braking which is in a non-operating state, the second cut valve 262 and the third dump valve 243 are switched to the closed state, and the third and fourth outlet valves 222c and 222d are switched to the open state. As a result, since the hydraulic pressure in the flow passage below the second cut valve 262 is escaped to the reservoir 30 through the third and fourth outlet valves 222c and 222d, the backup passage 252 below the second cut valve 262 and the second hydraulic circuit 202 are provided in atmospheric pressure state.

Next, as shown in FIG. 20, the second cut valve 262 is switched to the open state and the third and fourth outlet valves 222c and 222d connected to the second backup passage 252 are switched to the closed state.

Next, the hydraulic pressure supply apparatus 100 is operated to generate a hydraulic pressure. If the second piston 22a is not stuck, the hydraulic pressure in the hydraulic pressure supply apparatus 100 is moved to the first master chamber 20a through the first backup passage 251 to press and move the piston 22a so that a hydraulic pressure may be generated in the second hydraulic circuit 202 and a pressure higher than atmospheric pressure may be sensed by the second hydraulic passage pressure sensor PS2.

However, if the second piston 22a is stuck, the second piston 22a is not moved by the hydraulic pressure in the first master chamber 20a so that a pressure higher than atmospheric pressure may be not sensed by the second hydraulic passage pressure sensor PS2, or the second piston 22a is moved non-linearly so that a non-linear pressure may be sensed by the second hydraulic passage pressure sensor PS2.

On the other hand, unlike in FIG. 20, the third and fourth inlet valves 221c and 221d may be switched to the closed state. In this case, the hydraulic pressure may be transmitted only to the flow passages between the third and fourth inlet valves 221c and 221d from the second master chamber 20b, so that an immediate pressure reaction may be inspected.

In the above, the electronic brake system 1 including the hydraulic pressure providing unit 110 operating in a double acting type is exemplified, but the present disclosure is not limited thereto. For example, a single acting type may also be applied by a person skilled in the art through appropriate correction and modification.

As is apparent from the above, the electronic brake system according to an embodiment of the present disclosure can flexibly provide or release a braking force according to braking situations by separating a low-pressure section and a high-pressure section according to the forward and backward movement of the piston to provide a hydraulic pressure or a negative pressure.

Further, the electronic brake system according to an embodiment of the present disclosure can provide a hydraulic pressure more quickly and control the pressure increase more precisely by configuring the piston of the hydraulic pressure supply apparatus in a double acting manner.

Further, the electronic brake system according to an embodiment of the present disclosure can provide a braking force with a pressure higher than the maximum pressure in the low-pressure section by using the high-pressure section.

Further, the electronic brake system according to an embodiment of the present disclosure not only can perform the braking of a vehicle by allowing the hydraulic pressure generated from the master cylinder to be transmitted to the wheel cylinders during an abnormal operation of the hydraulic pressure supply apparatus (in the fallback mode), but also can cooperate with the electronic parking brakes EPB to provide a stable braking force. The electronic brake system can also exhibit the maximum deceleration effect by providing the hydraulic pressure generated from the master cylinder only to the front wheels and by braking the rear wheels through the electronic parking brakes.

Further, the electronic brake system according to an embodiment of the present disclosure can sense whether the piston is stuck or the simulator valve leaks by executing the inspection mode. The electronic brake system thus can produce a braking force of a certain level or higher even if the failure of any element of the electronic brake system occurs.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. An electronic brake system comprising:
a hydraulic pressure supply apparatus including a motor operated by an electrical signal outputted corresponding to a displacement of a brake pedal, a power converting unit for converting a rotational force of the motor into a linear movement, a cylinder block, a hydraulic piston connected to the power converting unit and movably accommodated in the cylinder block, a first pressure chamber provided at one side of the hydraulic piston and connected to one or more wheel cylinders, and a second pressure chamber provided at the other side of the hydraulic piston and connected to one or more wheel cylinders;
a first dump passage communicating directly with the first pressure chamber and connected directly to a reservoir in which oil stored;
a second dump passage communicating directly with the second pressure chamber and connected directly to the reservoir;
a first dump valve provided on the first dump passage to control the flow of oil and provided as a check valve for blocking the flow of oil in the opposite direction while allowing the flow of oil in the direction to the first pressure chamber from the reservoir;
a second dump valve provided on the second dump passage to control the flow of oil and provided as a check valve for blocking the flow of oil in the opposite direction while allowing the flow of oil in the direction to the second pressure chamber from the reservoir;
a third dump valve provided on a bypass passage connecting an upstream side and a downstream side of the second dump valve on the second dump passage to control the flow of oil and provided as a solenoid valve for controlling the flow of oil in both directions between the reservoir and the second pressure chamber; and
a fourth dump valve provided on a bypass passage connecting an upstream side and a downstream side of the first dump valve on the first dump passage to control the flow of oil and provided as a solenoid valve for controlling the flow of oil in both directions between the reservoir and the first pressure chamber.

2. The electronic brake system according to claim 1, further comprising:
a first hydraulic passage communicating with the first pressure chamber;
a second hydraulic passage branched from the first hydraulic passage;
a third hydraulic passage branched from the first hydraulic passage;
a fourth hydraulic passage communicating with the second pressure chamber;
a fifth hydraulic passage branched from the fourth hydraulic passage to join with the second hydraulic passage and the third hydraulic passage;
a sixth hydraulic passage branched from the fourth hydraulic passage to join with the second hydraulic passage and the third hydraulic passage;
a first hydraulic circuit branched from the second hydraulic passage to be connected to two wheel cylinders; and a second hydraulic circuit branched from the third hydraulic passage to be connected to two wheel cylinders.

3. The electronic brake system according to claim 2, further comprising:
a first control valve provided on the second hydraulic passage to control the flow of oil;
a second control valve provided on the third hydraulic passage to control the flow of oil;
a third control valve provided on the fifth hydraulic passage to control the flow of oil; and
a fourth control valve provided on the sixth hydraulic passage to control the flow of oil.

4. The electronic brake system according to claim 3,
wherein the first control valve, the second control valve, and the fourth control valve are provided as check valves for blocking the flow of oil in the opposite direction while allowing the flow of oil in the direction to the wheel cylinders from the hydraulic pressure supply apparatus, and
the fifth control valve is provided as a solenoid valve for controlling the flow of oil in both directions between the hydraulic pressure supply apparatus and the wheel cylinders.

5. The electronic brake system according to claim 2, further comprising:
a seventh hydraulic passage communicating the second hydraulic passage and the third hydraulic passage; and
a fifth control valve provided on the seventh hydraulic passage to control the flow of oil,
wherein the fifth control valve is provided as a solenoid valve for controlling the flow of oil in both directions between the hydraulic pressure supply apparatus and the wheel cylinders.

6. The electronic brake system according to claim 5,
wherein the fifth control valve is installed between a point where the seventh hydraulic passage joins with the third hydraulic passage and a point where the seventh hydraulic passage joins with an eighth hydraulic passage.

7. The electronic brake system according to claim 5, further comprising:
an eighth hydraulic passage communicating the second hydraulic passage and the seventh hydraulic passage; and
a sixth control valve provided on the eighth hydraulic passage to control the flow of oil,
wherein the sixth control valve is provided as a solenoid valve for controlling the flow of oil in both directions between the hydraulic pressure supply apparatus and the wheel cylinders.

8. The electronic brake system according to claim 5,
wherein a hydraulic passage joining the fifth hydraulic passage and the sixth hydraulic passage is installed between a point where the fifth control valve disposed and a point where the second hydraulic passage joins with an seventh hydraulic passage.

9. The electronic brake system according to claim 1, further comprising:
a master cylinder having a first hydraulic port and a second first hydraulic port and generating a hydraulic pressure in accordance with a pedal effort applied to the brake pedal; a hydraulic control unit including a first hydraulic circuit and a second hydraulic circuit for controlling the hydraulic pressure discharged from the master cylinder or the hydraulic pressure supply apparatus to control the flow of the hydraulic pressure transmitted to the wheel cylinder provided on each wheel; a first backup passage connecting the first hydraulic port and the first hydraulic circuit; a second backup passage connecting the second hydraulic port and the second hydraulic circuit; a first cut valve provided on the first backup passage to control the flow of oil; a second cut valve provided on the second backup passage to control the flow of oil; an electronic control unit for controlling the motor and valves based on hydraulic pressure information and displacement information of the brake pedal; and electronic parking brakes that are provided on the wheel cylinders provided on the two rear wheels among the wheel cylinders provided on the respective wheels and that are capable of performing a braking by a motor,
wherein the electronic control unit determines whether the hydraulic pressure supply apparatus is in a normal state, generates a braking pressure to be transmitted to the respective wheel cylinders by operating the hydraulic pressure supply apparatus when the hydraulic pressure supply apparatus is determined to be in a normal state, and supplies the hydraulic pressure generated from the master cylinder to the front wheels through the first backup passage and the second backup passage and performs the braking operation in cooperation with the electronic parking brakes provided on the rear wheels when the hydraulic pressure supply apparatus is determined to be in an abnormal state.

10. The electronic brake system according to claim 9,
wherein the hydraulic control unit includes first to fourth inlet valves respectively provided on upper stream sides of the wheel cylinders so as to control the hydraulic pressure flowing to the wheel cylinders provided on the respective wheels; and first to fourth outlet valves for respectively controlling the flow of hydraulic pressure discharged from the wheel cylinders,
wherein the inlet valves connected to the rear wheels may be switched to a closed state so that the hydraulic pressure generated from the master cylinder flows only to the front wheels when the hydraulic pressure supply apparatus is determined to be in an abnormal state.

11. The electronic brake system according to claim 9,
wherein the first hydraulic circuit and the second hydraulic circuit are configured to control one front wheel and one rear wheel, respectively.

12. The electronic brake system according to claim 9, further comprising:
a circuit passage connecting the first hydraulic circuit and the second hydraulic circuit and a circuit valve provided on the circuit passage to open and close the circuit passage,
wherein in a case where the front wheels are controlled by one of the first hydraulic circuit and the second hydraulic circuit, the circuit valve is opened so that the hydraulic pressure is transmitted to the wheel cylinders provided on the front wheels.

13. The electronic brake system according to claim 1, further comprising:
a master cylinder that includes first and second chambers formed therein to communicate with the reservoir, and first and second pistons respectively disposed in the first and second chambers, in which the first and second pistons move in accordance with a pedal effort applied to the brake pedal to discharge oil;
a check valve provided on a reservoir passage connecting the reservoir and the master cylinder to allow only the flow of oil in the direction to the master cylinder from the reservoir;

an inspection passage connecting the master cylinder side of the reservoir passage on which the check valve is provided and the second pressure chamber side of the second dump passage on which the second dump valve and the third dump valve are provided; and an inspection valve as a check valve provided on the inspection passage to allow only the flow of oil in the direction to the master cylinder from the reservoir.

14. The electronic brake system according to claim 13, further comprising:

a hydraulic control unit including a first hydraulic circuit and a second hydraulic circuit that connect the hydraulic pressure supply apparatus and the wheel cylinders to transmit the hydraulic pressure discharged from the hydraulic pressure supply apparatus to the wheel cylinders provided on the respective wheels;

a first backup passage connecting a first chamber of the master cylinder and the first hydraulic circuit of the hydraulic control unit and connected to the hydraulic pressure supply apparatus on the way;

a second backup passage a second chamber of the master cylinder and the second hydraulic circuit of the hydraulic control unit and connected to the hydraulic pressure supply apparatus on the way;

a first cut valve provided on the first backup passage connecting the first chamber of the master cylinder and the first hydraulic circuit to control the flow of oil;

a second cut valve provided on the first backup passage connecting the second chamber of the master cylinder and the second hydraulic circuit to control the flow of oil;

a simulation apparatus provided on the first backup passage between the first cut valve and the master cylinder to provide a reaction force in accordance with a pedal effort applied to the brake pedal;

an electronic control unit for controlling the valves based on hydraulic pressure information and displacement information of the brake pedal;

a first pressure sensor installed between the first chamber of the master cylinder and the first cut valve; and a second pressure sensor installed on the first hydraulic circuit or the second hydraulic circuit, wherein the hydraulic control unit operates the hydraulic pressure supply apparatus in a state of closing the second cut valve, the third dump valve, and the first and second hydraulic circuits to form hydraulic pressure in the first pressure chamber, transmits the hydraulic pressure generated in the first pressure chamber to the master cylinder through the first backup passage while preventing the hydraulic pressure from being transmitted to the reservoir by closing the inspection passage with the third dump valve, and determines that a leak of the simulation apparatus occurs when a loss occurs by analyzing a measured value of the first pressure sensor.

15. The electronic brake system according to claim 13, further comprising:

a hydraulic control unit including a first hydraulic circuit and a second hydraulic circuit that transmit the hydraulic pressure discharged from the hydraulic pressure supply apparatus to the wheel cylinders provided on the respective wheels and have inlet valves provided on hydraulic passages connecting the hydraulic pressure supply apparatus and the wheel cylinders and outlet valves provided on passages connecting the wheel cylinders and the reservoir;

a first backup passage connecting a first chamber of the master cylinder and the first hydraulic circuit of the hydraulic control unit and connected to the hydraulic pressure supply apparatus on the way;

a second backup passage a second chamber of the master cylinder and the second hydraulic circuit of the hydraulic control unit and connected to the hydraulic pressure supply apparatus on the way;

a first cut valve provided on the first backup passage connecting the first chamber of the master cylinder and the first hydraulic circuit to control the flow of oil;

a second cut valve provided on the first backup passage connecting the second chamber of the master cylinder and the second hydraulic circuit to control the flow of oil;

an electronic control unit for controlling the valves based on hydraulic pressure information and displacement information of the brake pedal;

a first pressure sensor installed between the first chamber of the master cylinder and the first cut valve; and a second pressure sensor installed on the first hydraulic circuit or the second hydraulic circuit, wherein the electronic control unit, in a state in which the hydraulic pressure in the second hydraulic circuit of the hydraulic control unit and a partial hydraulic pressure in the second backup passage are removed by closing the second cut valve and opening the outlet valves of the second hydraulic circuit connected to the second backup passage, operates the hydraulic pressure supply apparatus to form a pressure in the first pressure chamber and to form a pressure in the first chamber of the master cylinder by transmitting the hydraulic pressure generated in the first pressure chamber through the first backup passage, and determines whether the second piston of the master cylinder is stuck by analyzing a measured value of the second pressure sensor.

* * * * *